(12) United States Patent
Nagaoka

(10) Patent No.: US 10,481,580 B2
(45) Date of Patent: Nov. 19, 2019

(54) TRAJECTORY CONTROL DEVICE

(71) Applicant: MITSUBISHI ELECTRIC CORPORATION, Chiyoda-ku (JP)

(72) Inventor: Kotaro Nagaoka, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 290 days.

(21) Appl. No.: 15/030,794

(22) PCT Filed: Sep. 17, 2014

(86) PCT No.: PCT/JP2014/004772
§ 371 (c)(1),
(2) Date: Apr. 20, 2016

(87) PCT Pub. No.: WO2015/104736
PCT Pub. Date: Jul. 16, 2015

(65) Prior Publication Data
US 2016/0282846 A1    Sep. 29, 2016

(30) Foreign Application Priority Data

Jan. 7, 2014  (JP) ................................. 2014-000979

(51) Int. Cl.
| G05B 19/4062 | (2006.01) |
| B23Q 15/22 | (2006.01) |
| G05B 19/404 | (2006.01) |
| G05B 19/402 | (2006.01) |

(52) U.S. Cl.
CPC ......... *G05B 19/4062* (2013.01); *B23Q 15/22* (2013.01); *G05B 19/402* (2013.01); *G05B 19/404* (2013.01); *G05B 2219/33221* (2013.01)

(58) Field of Classification Search
CPC .......... G05B 19/4062; G05B 19/402; G05B 19/404; G05B 19/23–378; B23Q 15/22
See application file for complete search history.

(56) References Cited

U.S. PATENT DOCUMENTS

| 4,751,443 A * | 6/1988 | Jackson .................. G06G 7/72 318/561 |
| 5,198,984 A | 3/1993 | Yamaguchi et al. |

(Continued)

FOREIGN PATENT DOCUMENTS

| CN | 101404127 A * | 4/2009 |
| JP | 59-194207 A | 11/1984 |

(Continued)

OTHER PUBLICATIONS

Bullock et al., Servo Basics for the Layman, Moting Control Magazine, Jun. 1991.*

(Continued)

*Primary Examiner* — Jarrett J Stark
(74) *Attorney, Agent, or Firm* — Oblon, McClelland, Maier & Neustadt, L.L.P.

(57) ABSTRACT

A trajectory control device that controls a trajectory of a movable portion of a processing machine so as to follow a command path accurately. The trajectory control device includes an integrated-length calculation unit that calculates an integrated command length being a length integrated from a start position along a command path, a simulated servo-response filter unit that calculates an integrated response length, a reference-response calculation unit that calculates a reference response position, a response compensation unit that calculates a corrected command position on each of the plurality of axes, and a servo control unit that controls each of the plurality of axes.

6 Claims, 17 Drawing Sheets

(56) References Cited

U.S. PATENT DOCUMENTS

| | | | |
|---|---|---|---|
| 5,254,921 A * | 10/1993 | Matsubara | G05B 19/4062 318/561 |
| 6,437,534 B1 | 8/2002 | Kakino et al. | |
| 8,654,466 B1 * | 2/2014 | McFadyen | G11B 5/607 360/31 |
| 8,938,316 B2 * | 1/2015 | Otsuki | G05B 19/4069 700/160 |
| 2009/0086360 A1 * | 4/2009 | Ling | B82Y 10/00 360/75 |
| 2013/0221885 A1 * | 8/2013 | Hunter | H02P 21/0003 318/400.15 |
| 2014/0371899 A1 | 12/2014 | Nagaoka | |

FOREIGN PATENT DOCUMENTS

| | | |
|---|---|---|
| JP | 63-206806 A | 8/1988 |
| JP | 63-233402 A | 9/1988 |
| JP | 64-7203 A | 1/1989 |
| JP | 2-66604 A | 3/1990 |
| JP | 5-250002 A | 9/1993 |
| JP | 6-282321 A | 10/1994 |
| JP | 2001-79731 A | 3/2001 |
| JP | 2006-15431 A | 1/2006 |
| JP | 2011-145884 A | 7/2011 |
| JP | 2014-10679 A | 1/2014 |
| WO | 2013/140679 A1 | 9/2013 |

OTHER PUBLICATIONS

Y. Tian, Y. Zhang, L. Cai and Q. D. Meng, "A Novel Digital Filter Control Technique of Servo System," 2012 International Conference on Control Engineering and Communication Technology, Liaoning, 2012, pp. 113-116.*

International Search Report dated Dec. 16, 2014, in PCT/JP2014/004772 Filed Sep. 17, 2014.

* cited by examiner

FIG. 13
(a)
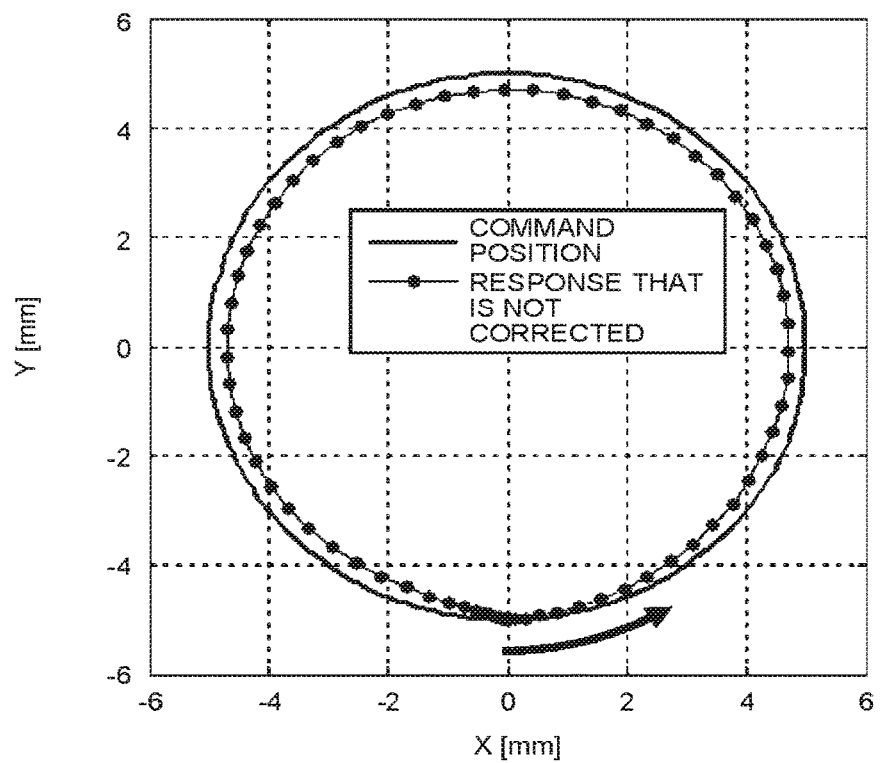
(b)
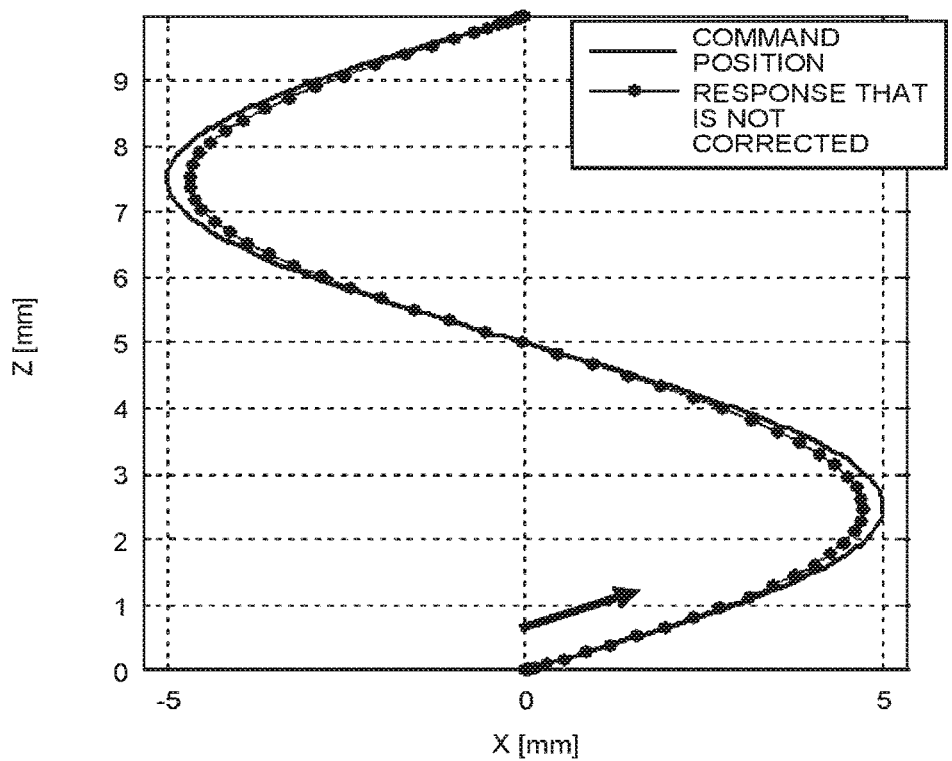

FIG. 14
(a)
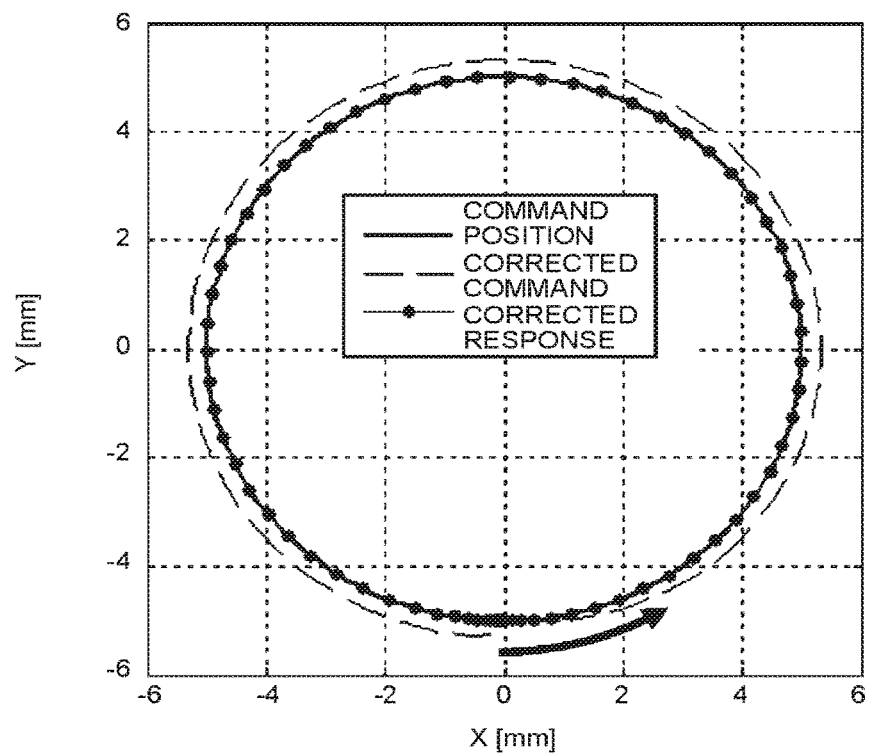
(b)
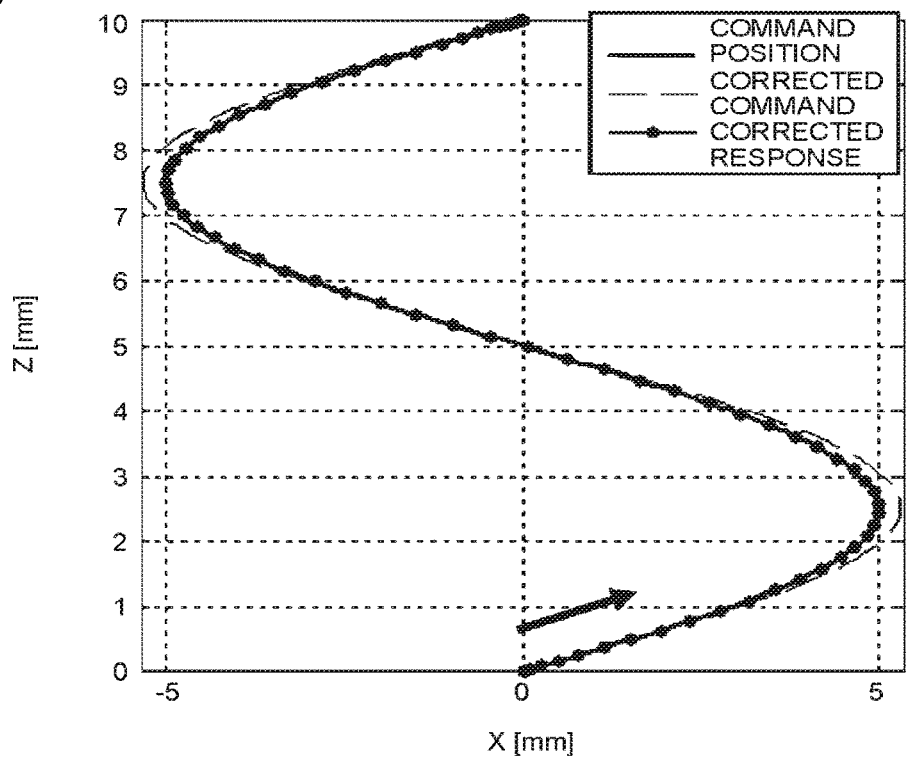

TRAJECTORY CONTROL DEVICE

FIELD

The present invention relates to a trajectory control device for realizing high-speed and highly accurate machining by controlling a trajectory, in a control device of a processing machine.

BACKGROUND

When machining is to be performed by using a processing machine such as a machine tool or a laser processing machine, it is controlled such that a position of a tool with respect to a workpiece being a machining object or a position of a machining head mounted with a laser nozzle moves along a command path. This control is referred to as "trajectory control", and is executed by executing servo control so that actual positions on respective movable axes of a machine generally follow command positions on the respective movable axes obtained from the command path.

The number of axes of the movable axes to be controlled simultaneously during the trajectory control is different depending on the application of the processing machine; however, it is generally from two axes to five axes. Further, the number of axes of the movable axes to be controlled simultaneously is not limited thereto, and may be six or more axes. As an example of two axes, a sheet-metal laser processing machine can be mentioned. This is for constructing a predetermined shape of a workpiece, by two-dimensionally sweeping a machining head mounted with a laser nozzle on a surface of a plate-like material by using two straight axes, and irradiating laser beams at a timing specified by a machining program.

As a representative example of three axes, a vertical machining center can be mentioned. This is for constructing a predetermined three-dimensional shape such as a mold or parts, by vertically grasping a machining head mounted with a tool such as an end mill to move the machining head in a three-dimensional space by using three straight axes, while rotating the machining head by a main spindle motor. Further, a five-axis processing machine is such that two rotary axes are added to the three-axis vertical machining center, which can control the posture of the tool in addition to a position of the tool in the three-dimensional space.

In the processing machine having any number of axes, a numerical control device reads a machining program, and interpolates between respective points commanded by the machining program, to generate a command position on the respective movable axes for each control cycle. Servo control is then executed by a servo control device respectively provided on each movable axis so that an actual position on each movable axis follows a command position on each movable axis. In the following descriptions, the numerical control device and the servo control device of each movable axis are collectively referred to as "trajectory control device".

As an issue on executing the trajectory control, there is a point that the actual path deviates from the commanded path due to a response delay of a servo control system of each movable axis. Generally, control is executed for each movable axis of the machine. Therefore, a response of the servo system of each movable axis moves with delay than the command position due to an error caused by the response delay or the like of the control system of each movable axis. If a moving direction of the command path does not change, for example, in the case of a straight line, even if each axis moves with delay, the trajectory of the response of the servo control system does not deviate from the command path. That is, although an error appears in a tangent direction of the command path, an error in a normal direction of the command path does not appear. On the other hand, if the moving direction of the command path changes, for example, in the case of a curve or a corner shape, an error appears in the normal direction of the command path due to the delay of the servo control system of each axis.

In the following descriptions, among errors of the response position in the servo control system with respect to the command position, a component in the tangent direction of the command path is referred to as "following error", and a component in the normal direction of the command path is referred to as "trajectory error" Generally, if there is a trajectory error, the machining shape does not match an original shape, which is not preferable.

To suppress occurrence of such trajectory errors, in Patent Literature 1, an optimum feed rate in order to suppress occurrence of errors to a certain value or less is calculated based on a machining shape recognized by looking ahead the program. An error amount at the time of machining at this rate is calculated, and the command position is corrected by adding a correction vector that negates the error to the original command position. The direction of the correction vector is vertical to the moving direction (a normal direction), and a length of the correction vector has a value obtained by multiplying normal direction acceleration (a value obtained by dividing a square of speed by a radius of curvature) by a predetermined coefficient.

In Patent Literature 2, in control of a finger position of a robot, a finger position at a time ahead of a predetermined sampling time is estimated, and the command position is corrected by a portion of a normal vector drawn from the estimated finger position onto a target trajectory. Accordingly, the finger position is controlled to move on the target trajectory, while allowing a time delay.

CITATION LIST

Patent Literatures

Patent Literature 1: Japanese Patent Application Laid-open No. H6-282321 (pages 4 to 5, FIG. 1)
Patent Literature 2: Japanese Patent Application Laid-open No. 2006-15431 (pages 5 to 6, FIG. 3)

SUMMARY

Technical Problem

However, in the method of Patent Literature 1, calculation of the correction vector is based on only information of a move command such as the normal direction acceleration of the command value instructing movement, and the actual servo response is not taken into consideration. Therefore, if the normal direction acceleration of the command value changes transitionally, such as when a straight line and a circular arc are continuous, or if a complicated shape including a three-dimensional shape is approximated by a fine segment command and instructed, the correction vector cannot be calculated accurately. If the normal direction acceleration of the command value in the move command is constant, a trajectory error amount can be estimated from the normal direction acceleration. Further, in a state where the normal direction acceleration is changing (in a transitional state), there is a difference between a trajectory error amount estimated based on the normal direction acceleration of the move command and an actually occurring trajectory error amount. Therefore, a trajectory error occurs between a response trajectory when using the correction vector calculated based on the estimated trajectory error amount and the original command trajectory, and as a result, distortion is generated in the shape of the response trajectory.

Next, in the method of Patent Literature 2, the command position is corrected by using the actual finger position, that is, the response position. However, the correction amount is determined based on the response at a time ahead of a certain time, while assuming that the response delay time is constant. Therefore, if the moving direction of the command changes from moment to moment, the response delay time transitionally changes, and thus correction is not performed correctly, which causes a problem that the response trajectory deviates from the command trajectory.

Furthermore, in Patent Literature 2, a perpendicular to the target trajectory needs to be calculated. However, in a complicated command shape such that the moving direction changes from moment to moment, there is a problem that a plurality of perpendiculars to the target trajectory are present according to a relation between the target trajectory and the response position, and thus the correction amount cannot be defined uniquely. For example, such a command shape is considered that two sides form a predetermined angle, such as a corner portion in a rectangle. In this case, when a position of a control object is on a bisector of the predetermined angle described above, a foot of the perpendicular is respectively present on each of the two sides, and thus the correction amount cannot be determined uniquely. Further, if the direction or the length of the perpendicular steeply changes, the correction amount rapidly changes to give a shock to the machine, thereby causing vibrations.

Further, in Patent Literature 2, all the servo responses of the respective movable axes need to be calculated in order to calculate the response position, and this causes a problem of increasing a calculation amount. This becomes noticeable particularly when the number of movable axes is large.

In Patent Literatures 1 and 2, to calculate the correction amount of the command position, look-ahead of the move command is required, thereby complicating the arithmetic processing. Further, because the machining program is sequentially processed by the numerical control device, in order to perform look-ahead, an operation needs to be stopped for a time required for the look-ahead to read the move command for a required amount. Accordingly, the machining time becomes longer by that amount.

The present invention has been achieved in view of the above problems, and an object of the present invention is to provide a trajectory control device that controls a trajectory of a movable portion of a processing machine so as to follow a commanded path accurately, even if the normal direction acceleration of the move command transitionally changes, or the moving direction of the move command changes from moment to moment.

Solution to Problem

According to an aspect of the present invention, there is provided a trajectory control device that controls a trajectory of a movable portion of a processing machine driven by a plurality of axes, the trajectory control device including: an integrated-length calculation unit that calculates an integrated command length, being a length integrated from a start position, along a command path defined as a history of a command position with respect to each of the plurality of axes; a simulated servo-response filter unit that calculates an integrated response length by activating a first filter that simulates a servo response of the plurality of axes with respect to the integrated command length; a reference-response calculation unit that calculates a reference response position, being a position on the command path, at which a length from the start position along the command path is equal to the integrated response length; a response compensation unit that calculates a corrected command position on each of the plurality of axes by activating a second filter having inverse characteristics of the servo response of the plurality of axes, with respect to respective coordinate values in each of the plurality of axes at the reference response position; and a servo control unit that controls each of the plurality of axes by outputting drive torque so that each position on each of the plurality of axes follows the corrected command position.

Advantageous Effects of Invention

According to the present invention, if the normal direction acceleration of the move command changes transitionally, or even if the moving direction of the move command changes from moment to moment, the reference response position and the corrected command position are obtained based on the integrated response length, thereby enabling to control the trajectory of the movable portion so that the corrected response position accurately follows the commanded path.

Further, the corrected command position can be obtained uniquely, and calculation of the corrected command position can be performed stably.

BRIEF DESCRIPTION OF DRAWINGS

FIG. 13 are diagrams illustrating a trajectory when correction of a command position is not performed in the second embodiment of the present invention.

FIG. 14 are diagrams illustrating a trajectory when correction of a command position is performed in the second embodiment of the present invention.

DESCRIPTION OF EMBODIMENTS

Embodiments of a trajectory control device according to the present invention will be explained below in detail with reference to the accompanying drawings. Note that the embodiments illustrated below are examples and the present invention is not limited to the embodiments.

First Embodiment

Figure 1:
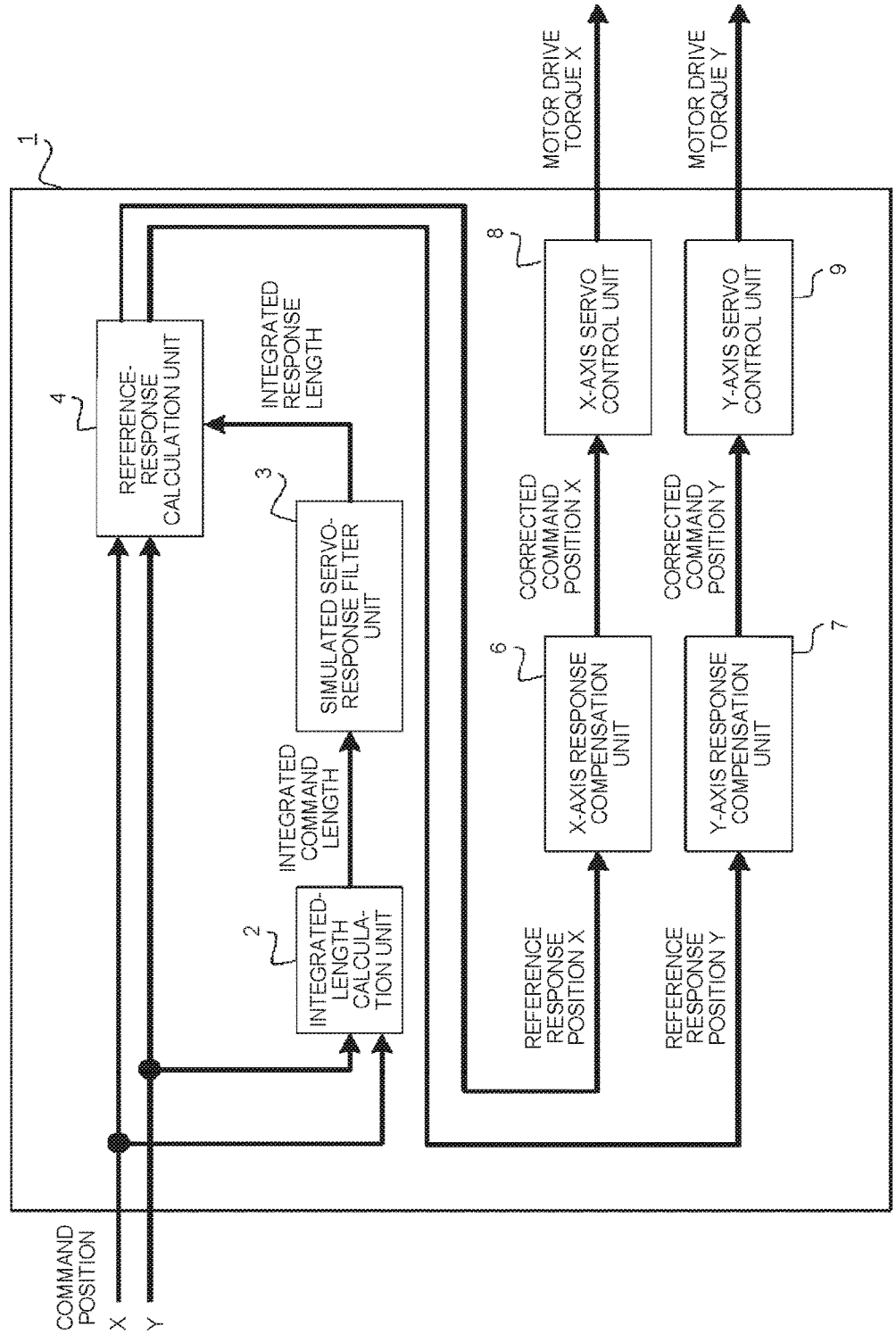
FIG. 1 is a block diagram illustrating a trajectory control device according to a first embodiment of the present invention.
Figure 2:
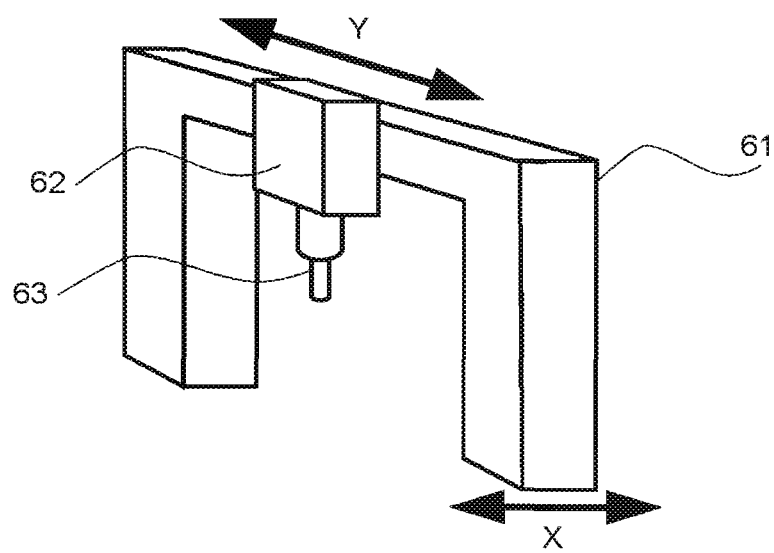
FIG. 2 is a schematic diagram illustrating a control object in the first embodiment of the present invention.

FIG. 1 is a block diagram illustrating a trajectory control device according to a first embodiment of the present invention. FIG. 2 is a schematic diagram illustrating a two-dimensional processing machine to be controlled in the present embodiment.

In FIG. 2, a machining head 63 is attached to a Y-axis movable portion 62, and is driven in a Y-axis direction by a Y-axis motor (not illustrated). Further, a Y-axis drive mechanism including the Y-axis movable portion 62 and the Y-axis motor is attached to an X-axis movable portion 61, and is driven in an X-axis direction by an X-axis motor (not illustrated). An X-axis drive mechanism including the X-axis movable portion 61 and the X-axis motor is attached to a processing machine body (not illustrated). It is assumed that an X axis and a Y axis are orthogonal to each other.

The drive of the X-axis motor and the Y-axis motor is controlled by a trajectory control device 1 illustrated in FIG. 1. The trajectory control device 1 includes an integrated-length calculation unit 2, a simulated servo-response filter unit 3, a reference-response calculation unit 4, an X-axis response compensation unit 6, a Y-axis response compensation unit 7, an X-axis servo control unit 8, and a Y-axis servo control unit 9.

Command positions on the X axis and the Y axis are input to the trajectory control device 1 as a move command. In the trajectory control device 1, the command positions on the X axis and the Y axis are input to the integrated-length calculation unit 2, and an integrated command length is output. The integrated command length is input to the simulated servo-response filter unit 3. An output from the simulated servo-response filter unit 3 is input to the reference-response calculation unit 4 together with the command positions on the X axis and the Y axis, so as to calculate an X-axis reference response position and a Y-axis reference response position. The X-axis reference response position and the Y-axis reference response position are respectively input to the X-axis response compensation unit 6 and the Y-axis response compensation unit 7, and an X-axis corrected command position and a Y-axis corrected command position are respectively output. The X-axis corrected command position and the Y-axis corrected command position are respectively input to the X-axis servo control unit 8 and the Y-axis servo control unit 9, and an X-axis motor drive torque and a Y-axis motor drive torque are respectively output.

Figure 3:
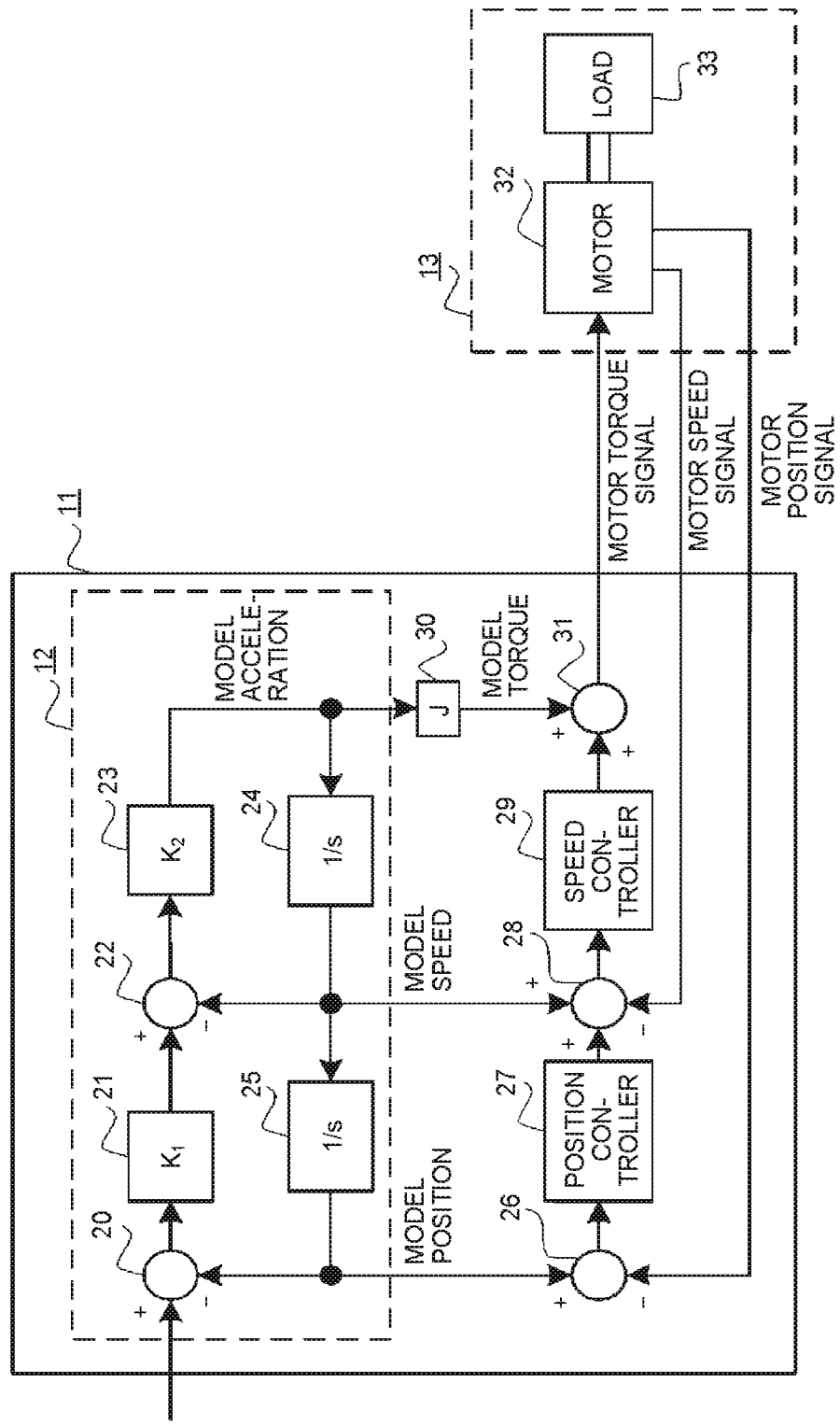
FIG. 3 is a block diagram illustrating a servo control unit in the first embodiment of the present invention.

The X-axis servo control unit 8 and the Y-axis servo control unit 9 have the same configuration, and a block diagram thereof is illustrated in FIG. 3, together with a block diagram of a mechanical system 13. The mechanical system 13 includes a motor 32 and a load 33. In the following descriptions, the X-axis servo control unit 8 and the Y-axis servo control unit 9 are collectively referred to as "servo control unit 11".

In FIG. 3, a model position is subtracted from the corrected command position input to the servo control unit 11 by a first subtractor 20. A first model-gain multiplier 21 multiplies the subtracted value by a first model gain (control gain) $K_1$. A second subtractor 22 subtracts a model speed from the multiplied value. A second model-gain multiplier 23 multiplies the subtracted value by a second model gain (control gain) $K_2$, to output a model acceleration. A first integrator 24 integrates the model acceleration to output the model speed. Further, a second integrator 25 integrates the model speed to output a model position. A block from the corrected command position to the model position described above is referred to as "normative model 12".

The first model gain $K_1$ and the second model gain $K_2$ are set to have the same value for the X-axis servo control unit 8 and the Y-axis servo control unit 9. Therefore, the normative models of the X-axis servo control unit 8 and the Y-axis servo control unit 9 have the same transfer function.

As illustrated in FIG. 3, a third subtractor 26 subtracts a motor position signal from the model position to output a position error. A position controller 27 executes proportional control on the position error. An adder-subtractor 28 adds the model speed to an output from the position controller 27, and subtracts a value of a motor speed signal to output a speed error. A speed controller 29 executes proportional and integral control on this speed error. Further, a proportional multiplier 30 multiplies the model acceleration by a value (J) corresponding to inertia of a control object, to calculate a model torque. A fourth adder 31 adds the model torque to an output from the speed controller 29 to output a motor torque signal.

The mechanical system 13 is driven by this motor torque signal, and the motor speed signal and the motor position signal are output to the servo control unit 11. In the present embodiment, as illustrated in FIG. 1, a load of the Y axis is the Y-axis movable portion 62 attached with the machining head 63, and a load of the X axis is the X-axis movable portion 61 and the Y-axis movable portion 62 driven thereon.

The servo control unit 11 is a two degree-of-freedom controller using the normative model, and followability to the command and responsiveness to disturbance can be designed independently. The followability to the command is determined by the first model gain $K_1$ and the second model gain $K_2$, and the responsiveness to disturbance is determined by the design of the position controller 27 and the speed controller 29.

A response of the servo system is controlled to follow a model position that is an output of the normative model 12, regardless of the actual characteristics of the control object. In the present embodiment, because the normative models having the same transfer function are used for the X-axis servo control system and the Y-axis servo control system, a response of the servo control system controlled by the X-axis servo control unit 8 and a response of the servo control system controlled by the Y-axis servo control unit 9 are identical. These responses can be represented by the transfer function of the normative model.

The integrated-length calculation unit 2 calculates an integrated command length integrated along the command path from a start position, the command path being defined by the history of the command position on each of the movable axes. The calculation of the integrated command length is performed in the following manner. It is assumed that the command position is updated once every one constant control cycle T, and an nth (n is zero or a natural number) command position is represented by Pcn. Pcn is a coordinate having two elements of an X-axis direction component and a Y-axis direction component, and a coordinate value thereof is represented by (xcn, ycn) Further, a start position of the movement is represented by Pc0, and a coordinate thereof is represented by (xc0, yc0). An integrated command length Lcn at the nth command position is obtained by integrating a geometric norm of a vector from the start position, the vector being from an (n−1)th command position Pc(n−1) that is a previous value of the command position (a previous command position) to the current command position Pcn. The geometric norm is a square-root of sum of squares of respective elements of the vector. This is represented by the following equation (1).

[Equation 1]

$$L_{cn} = \sum_{k=1}^{n} \sqrt{(x_{ck} - x_{c(k-1)})^2 + (y_{ck} - y_{c(k-1)})^2} \quad (1)$$

Figure 4:
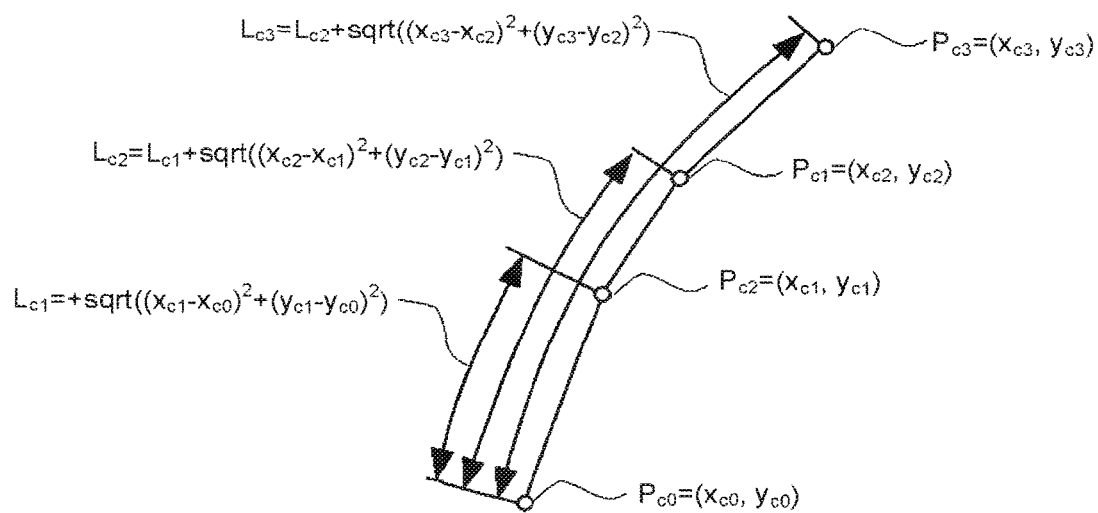
FIG. 4 is an explanatory diagram of an operation of an integrated-length calculation unit in the first embodiment of the present invention.

FIG. 4 schematically illustrates a relation between the command position Pcn and the integrated command length Lcn at n=0 to 3. The integrated command length Lc0 at n=0 (a start position) is zero. In FIG. 4, "sqrt (equation A)" represents a square root of the equation A.

The simulated servo-response filter unit 3 activates a filter on the integrated command length Lcn, the filter simulating the servo response. The servo response is generally represented by the form of the transfer function. In the present embodiment, the simulated servo-response filter unit 3 is configured such that the servo response of the servo system controlled by the servo control unit 11 and the servo response of the simulated servo-response filter unit 3 become identical. When two degree-of-freedom control using the normative model is applied to the servo control unit 11, the servo response of the servo control unit 11 becomes a response represented by the transfer function of the normative model. As described above, the X-axis servo control unit 8 and the Y-axis servo control unit 9 have the same configuration, and use the same control gain (the first model gain $K_1$ and the second model gain $K_2$). Therefore, the X-axis normative model and the Y-axis normative model are configured as filters having the same configuration. In the case of the servo control unit 11 illustrated in FIG. 3, a transfer function Gm(s) of the normative model 12 is represented in a form of a secondary low-pass filter by the following equation (2).

[Equation 2]

$$G_m(s) = \frac{K_1 K_2}{s^2 + K_2 s + K_1 K_2} \quad (2)$$

An output of the low-pass filter can be obtained by expressing the transfer function of the equation (2) in a format of a differential equation, a difference equation, a transfer function, or the like and calculating its solution by numerical calculation. When a command form is known, an analytical solution can be obtained by integral calculation. Specifically, the analytical solution is obtained by performing inverse Laplace transformation with respect to a product of the transfer function and Laplace transformation of a given input.

A time t is represented by t=nT (T is a control cycle). When it is assumed that the integrated command length at the time t is Lc(t), an output of the simulated servo-response filter unit 3 when the integrated command length Lc(t) is input, that is, an integrated response length Lr(t) is represented by the following equation (3).

[Equation 3]

$$L_r(t) = F^{-1}[G_m(s)F[L_c(t)]] \quad (3)$$

Here, F[g(t)] denotes Laplace transformation of a time function g(t), and $F^{-1}[G(s)]$ denotes inverse Laplace transformation of a function G(s) of a region s (a complex domain).

Figure 5:
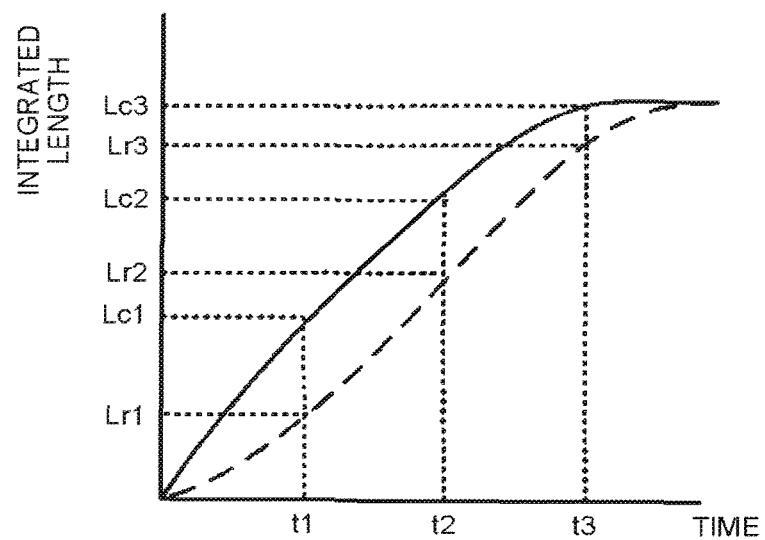
FIG. 5 is an explanatory diagram of an operation of a simulated servo-response filter unit in the first embodiment of the present invention.

FIG. 5 schematically illustrates time changes of the integrated command length Lc(t) and the integrated response length Lr(t), where t1=T, t2=2T, and t3=3T are established. In FIG. 5, the integrated response lengths at T=t1, t2, and t3 are represented respectively as Lr1, Lr2, and Lr3, and the integrated command lengths at T=t1, t2, and t3 are represented respectively as Lc1, Lc2, and Lc3. As illustrated in FIG. 5, by means of the simulated servo-response filter unit 3, the integrated response length Lr(t) follows the integrated command length Lc(t) with delay.

Subsequently, the reference-response calculation unit 4 calculates a reference response position, being a position on the command path, at which a length along the command path from the start position is equal to the integrated response length Lr(t). When it is assumed that the nth reference response position is Prn, a coordinate (xrn, yrn) thereof is obtained in the following manner.

First, the nth integrated response length Lrn is compared with the past integrated command lengths Lc1 to Lcn including the nth integrated command length Lcn, to determine on what number of segments of the command path a response reference point is. That is, k (k is a natural number) is obtained to have a value at which Lrn is equal to or larger than Lc(k−1) and smaller than Lck. Because the Lck monotonously increases with an increase of k, k can be uniquely obtained. Subsequently, a segment from a start point to an end point thereof, to which the reference response position belongs, is linearly interpolated by using a ratio defined by the integrated response length Lrn, and then a coordinate of the reference response position is determined. The coordinate (xrn, yrn) of the reference response position is obtained by the following equation (4).

[Equation 4]

$$x_{rn} = \frac{L_{rn} - L_{c(k-1)}}{|L_{ck} - L_{c(k-1)}|}(x_{ck} - x_{c(k-1)}) + x_{c(k-1)} \quad (4)$$

$$y_{rn} = \frac{L_{rn} - L_{c(k-1)}}{|L_{ck} - L_{c(k-1)}|}(y_{ck} - y_{c(k-1)}) + y_{c(k-1)}$$

Figure 6:
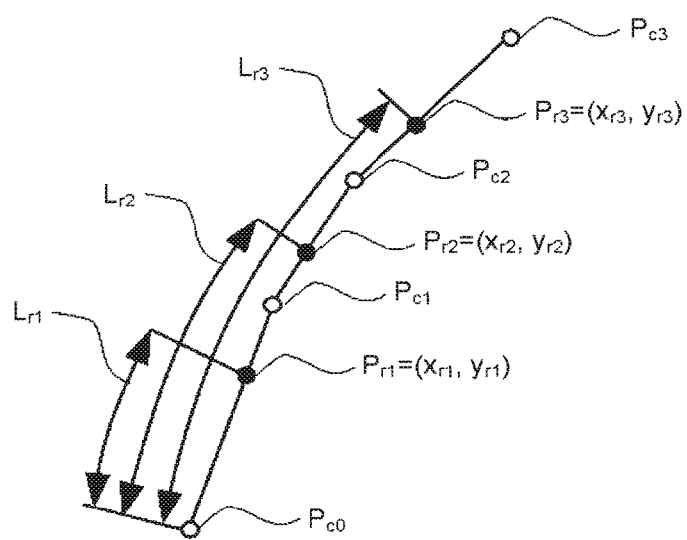
FIG. 6 is an explanatory diagram of an operation of a reference-response calculation unit in the first embodiment of the present invention.

For the case of n=1 to 3, a relation among the command path, the integrated response length Lrn, and the reference response position Prn is schematically illustrated in FIG. 6. In FIG. 6, the command path is represented by a segment connecting the command positions Pcn sequentially in order of the number n. Pc0 represents a start position.

Subsequently, the X-axis response compensation unit 6 and the Y-axis response compensation unit 7 respectively activate the filter having inverse characteristics of the servo response with respect to the X-axis component and the Y-axis component of the reference response position Prn. The servo response considered here is assumed to be the same as that of the servo control system controlled by the servo control unit 11. Therefore, a filter having a response with inverse characteristics of the normative model 12 is activated.

Figure 7:
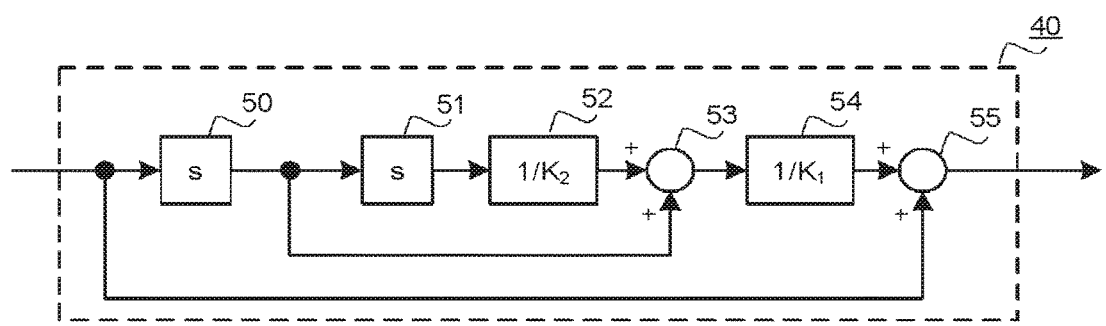
FIG. 7 is a block diagram illustrating a response compensation unit according to the first embodiment of the present invention.

FIG. 7 illustrates a block diagram of the X-axis response compensation unit 6 and the Y-axis response compensation unit 7. The respective response compensation units of the X axis and the Y axis have the same configuration, and these are illustrated as a response compensation unit 40 in FIG. 7. A signal input to the response compensation unit 40 (the X-axis reference response position and the Y-axis reference response position) is input to a first differential operation unit 50, and an output of the first differential operation unit 50 is input to a second differential operation unit 51. Here, it is assumed that the differential operation is performed by difference approximation, and a value obtained by dividing a difference between the previous value and the current value by the control cycle T is output as a differential value. A first coefficient multiplier 52 then multiplies the output from the second differential operation unit 51 by an inverse number of the second model gain $K_2$, and a first adder 53 adds the output from the first coefficient multiplier 52 and the output from the first differential operation unit 50. A second coefficient multiplier 54 multiplies the output from the adder 53 by an inverse number of the first model gain $K_1$, and a second adder 55 adds the output from the second coefficient multiplier 54 and the input signal to the response compensation unit 40, a result of which is defined as an output of the response compensation unit 40.

The transfer function between an input and an output of the response compensation unit 40 is represented by the following equation (5).

[Equation 5]

$$G_{comp}(s) = \frac{s^2 + K_2 s + K_1 K_2}{K_1 K_2} \quad (5)$$

As indicated by the equation (5), the equation (5) represents an inverse transfer function of the transfer function of the normative model in the equation (2), and the response compensation unit 40 has inverse characteristics of the normative model.

In FIG. 1, outputs of the X-axis response compensation unit 6 and the Y-axis response compensation unit 7 are input to the X-axis servo control unit 8 and the Y-axis servo control unit 9, respectively, as corrected command positions on the X axis and the Y axis, by using the output calculation method of the response compensation unit 40 described above. The X-axis servo control unit 8 and the Y-axis servo control unit 9 execute the servo control described above to calculate and output the motor drive torques for the X axis and the Y axis, thereby driving the X-axis motor and the Y-axis motor, respectively.

As described in the present embodiment, by executing the servo control after activating the response compensation unit 40 at the reference response position, the response positions on the respective movable axes acquired as a result of the servo control are caused to follow the reference response position. Because the reference response position is on the command path, the response positions on the respective movable axes are controlled to follow the reference response position on the command path without any error. Further, the corrected command position, which is an output of the response compensation unit 40, becomes the same position as the original position, if the moving direction does not change (if the command path is linear). On the other hand, if the moving direction changes (if the command path is curved), a position different from the original command position is output by the action of the response compensation unit 40, which is for the sake of suppressing occurrence of trajectory errors.

Example 1

Figure 8:
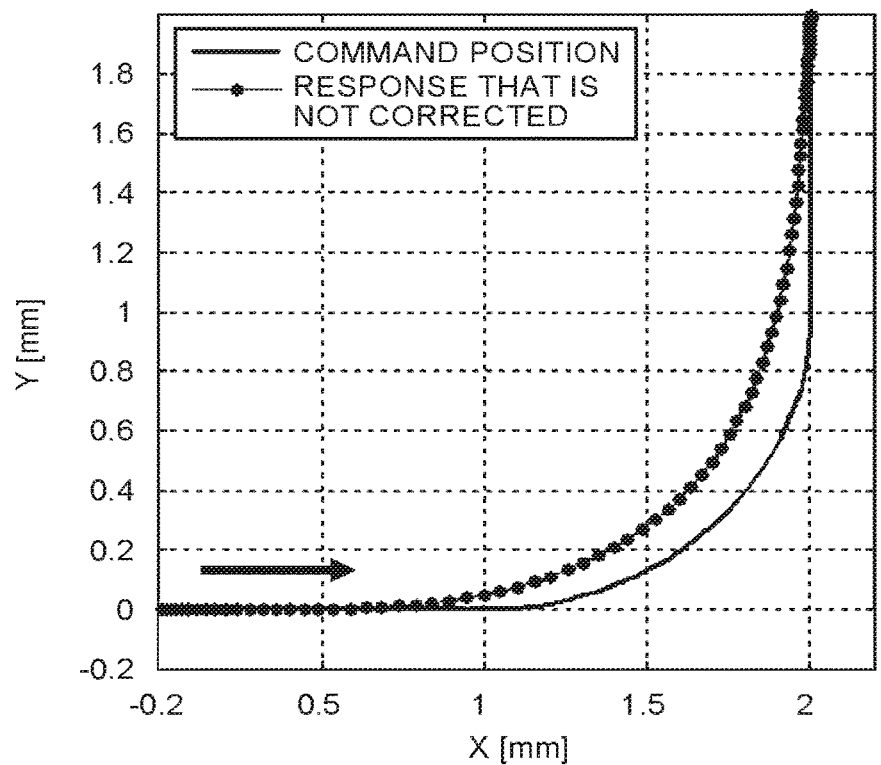
FIG. 8 is a diagram illustrating a trajectory of a response position when correction of a command position is not performed in the first embodiment of the present invention.

Effects of the present embodiment are described by using an Example. As the command path, a command path is used where a radius of a circular arc portion has a corner R shape of 1 millimeter (mm) (that is, a shape configured by a circular arc with a radius of 1 millimeter and two linear portions putting the circular arc therebetween). A trajectory of the command position, that is, the command path used in the present Example and a trajectory of the response position when correction of the command position is not performed are illustrated in FIG. 8. A point at (X, Y)=(0 mm, 0 mm) is a starting point (a start position), and a point at (X, Y)=(2 mm, 2 mm) is an ending point. The arrow in FIG. 8 indicates a moving direction of the command position in a specified path. Arrows in FIGS. 9, 13, 14, 20, and 21 described later have the same meaning as that of the arrow in FIG. 8.

In a graph of FIG. 8, an X-axis position is plotted on the horizontal axis, and a Y-axis position is plotted on the vertical axis. The solid line without dots indicates the command position, and the solid line with dots indicates a simulation result of a servo response position when correction of the command position is not performed (in FIG. 1, when the command positions on the respective movable axes are directly input to the servo control units of the respective axes). As simulation conditions, the feed rate is set to 2 m/min, the first model gain (control gain) $K_1$ in the normative model 12 of the X-axis and Y-axis servo control units is respectively set to 40 rad/s, and the second model gain (control gain) $K_2$ is set to four times the first model gain $K_1$. The control cycle T is set to 2 milliseconds (ms).

Figure 9:
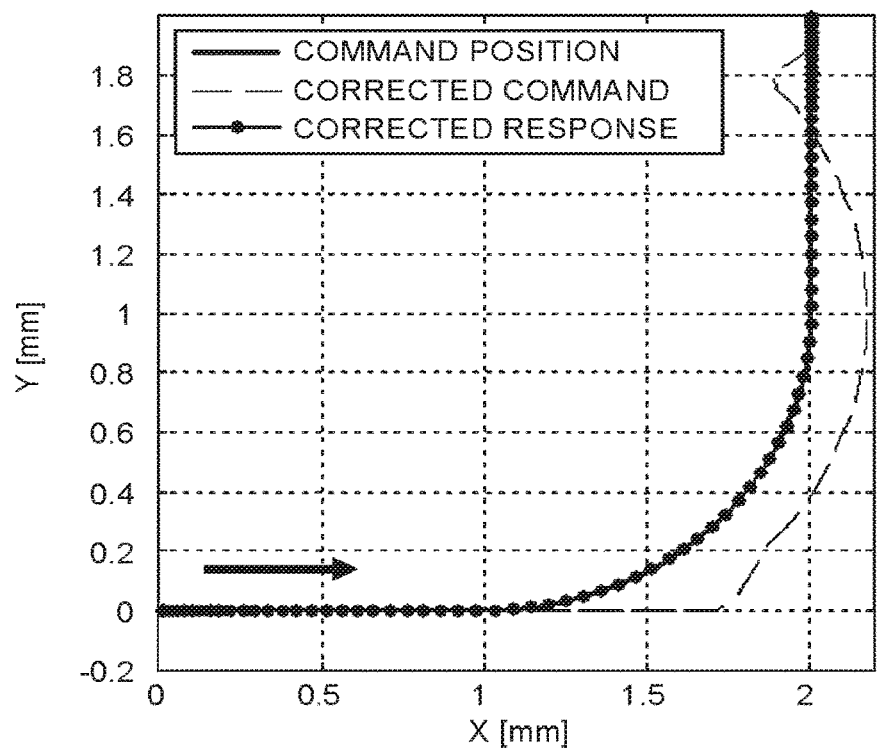
FIG. 9 is a diagram illustrating a trajectory of a response position when correction of a command position is performed in the first embodiment of the present invention.

Subsequently, simulation results of a trajectory of the corrected command position and a trajectory of the corrected response position when correction of the command position is performed are illustrated in FIG. 9. In FIG. 9, the solid line without dots indicates a trajectory of the original command position, the broken line indicates a trajectory of the corrected command position, and the solid line with dots indicates a trajectory of the response position. As the values of the feed rate, and the first model gain $K_1$ and the second model gain $K_2$ of the servo control unit, the same values as those when correction of the command position is not performed are used. When correction of the command position is performed, the trajectory of the original command position and the trajectory of the response position approximately match each other. To distinguish the both cases, dots are added to a waveform of the response position in FIG. 8 and FIG. 9.

Figure 10:
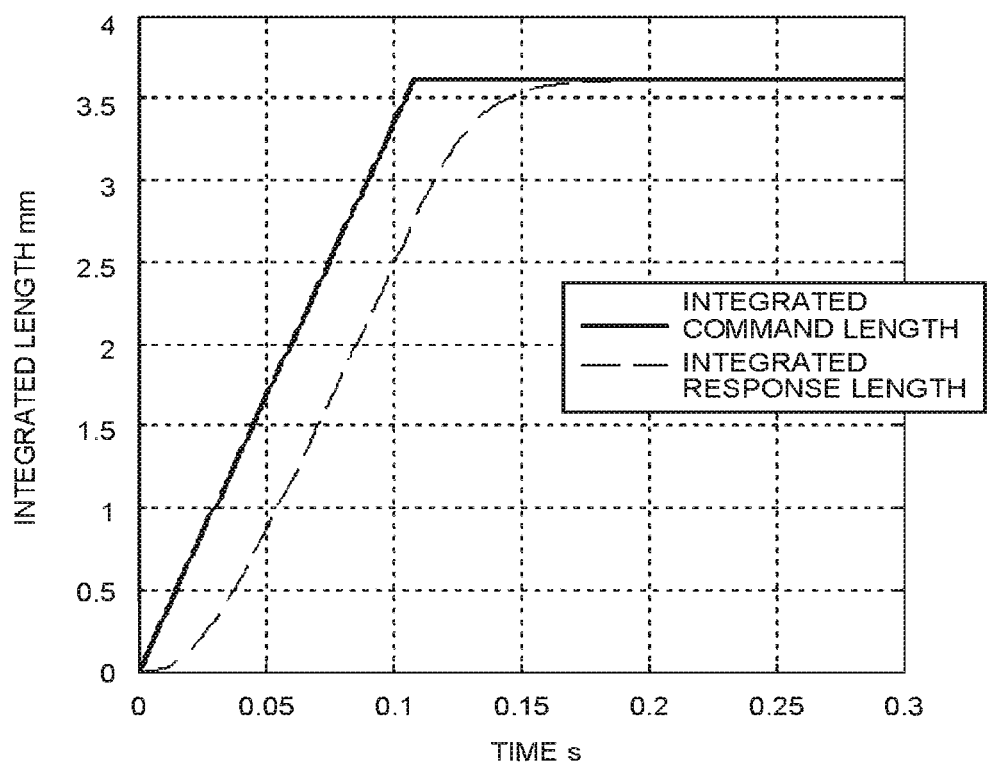
FIG. 10 is a diagram illustrating a time change of an integrated command length and an integrated response length in the first embodiment of the present invention.

FIG. 10 illustrates an input and an output of the simulated servo-response filter unit 3 in the present Example, that are, time changes of the integrated command length and the integrated response length.

From FIG. 8, it is understood that, when correction of the command position is not performed, a trajectory error of about 0.2 millimeter has occurred in the circular arc portion, due to an influence of the servo response delay on each axis. A command form used in the present Example is such that a linear portion and a circular arc portion are continuous, normal direction acceleration transitionally changes in the linear portion and the circular arc portion, and the moving direction changes from moment to moment in the circular arc portion. Therefore, a trajectory error is likely to occur in the command shape.

From FIG. 10, it is understood that, when correction of the command position is performed, in an integrated length direction (in a direction of the vertical axis in FIG. 10), a response is made with delay with respect to the command. On the other hand, because the solid line with dots in FIG. 9 matches the solid line without dots in FIG. 9, it is understood that occurrence of trajectory errors with respect to the command path is suppressed sufficiently. This is a result of calculation of the corrected command position by the response compensation unit of each axis, as illustrated by the broken line in FIG. 9, so that the servo response follows the reference response position obtained from the integrated response length and the command position.

As described above, according to the present embodiment, if the normal direction acceleration of the move command changes transitionally, or even if the moving direction of the move command changes from moment to moment, the reference response position and the corrected command position are obtained based on the integrated response length. Accordingly, the trajectory of the movable portion can be controlled so that the corrected response position accurately follows the commanded path.

Accordingly, calculation of the corrected command position can be performed stably.

Because the corrected command position can be calculated without obtaining the servo response of each axis, a calculation amount can be reduced.

Furthermore, the corrected command position can be calculated based on only the past history of the command position, without look-ahead of the move command. Accordingly, arithmetic processing is simplified, and such a case can be avoided that the machining time becomes long due to look-ahead.

Further, by using the two degree-of-freedom controller using the normative model for the servo control unit, the response of the servo control unit can be matched with the response of the normative model, regardless of the characteristics of the control object.

Furthermore, by using a filter represented by the inverse transfer function of the transfer function of the normative model for the response compensation unit, the actual position on each movable axis can accurately follow the reference response position which is a position along the command path. Accordingly, the trajectory can be controlled so that a trajectory error from the command path does not occur.

As described above, according to the present embodiment, when trajectory control is to be executed in a two-dimensional plane, occurrence of trajectory errors can be suppressed, thereby enabling to perform machining highly accurately.

Second Embodiment

Figure 11:
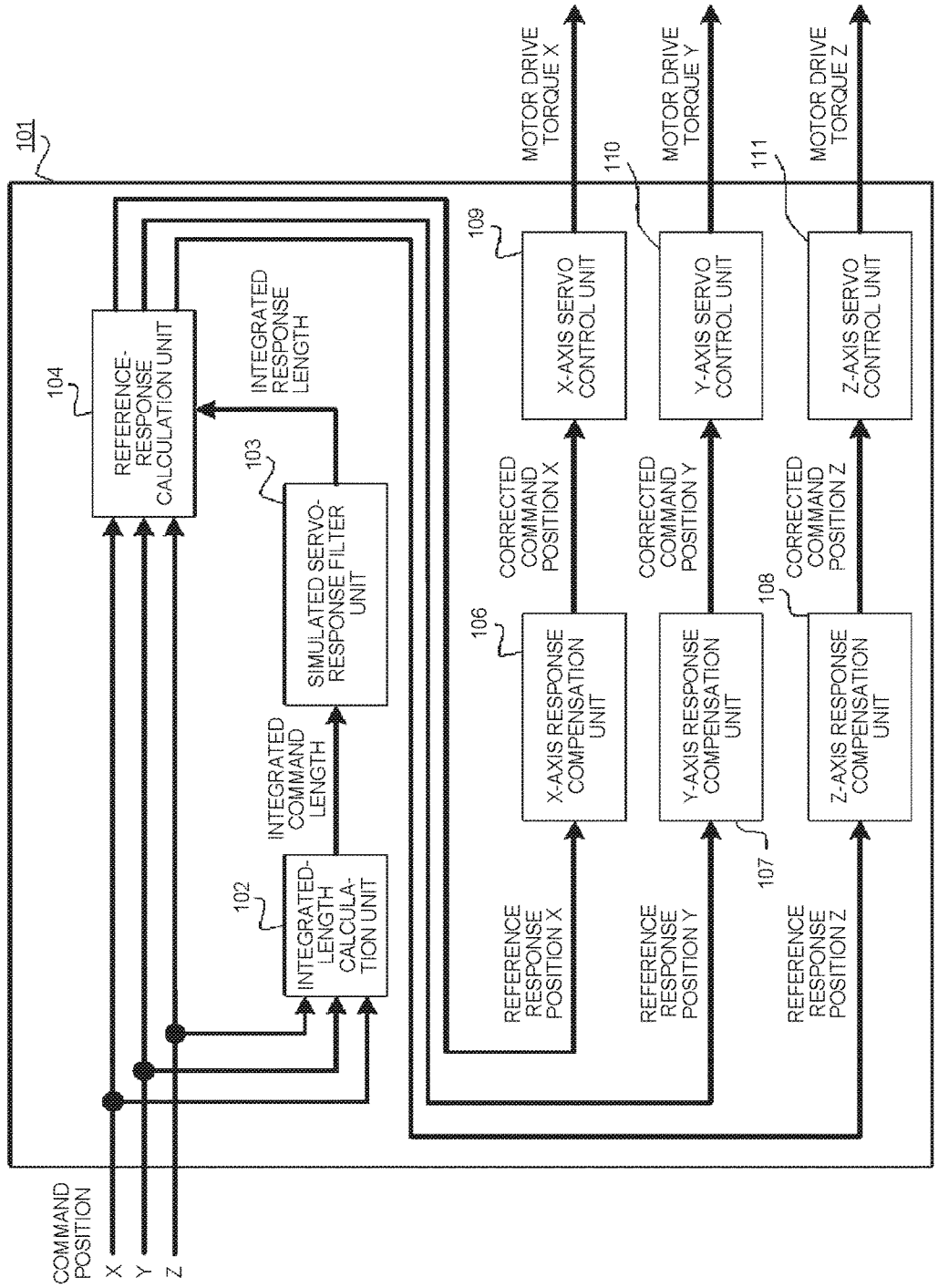
FIG. 11 is a block diagram illustrating a trajectory control device according to a second embodiment of the present invention.
Figure 12:
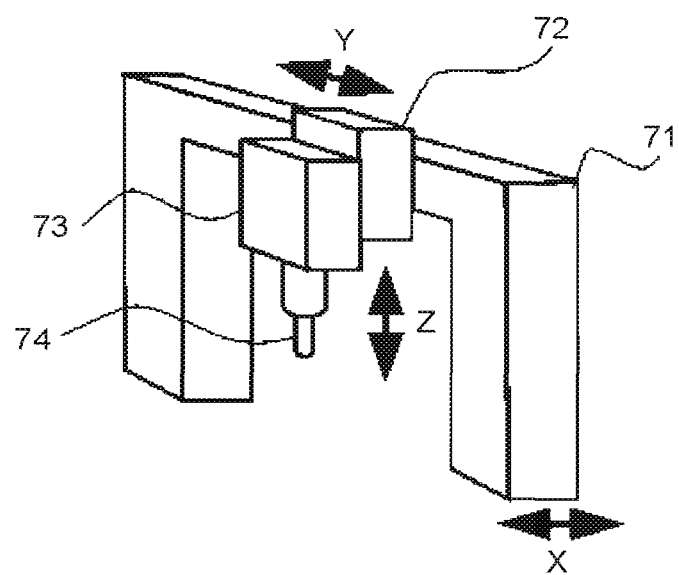
FIG. 12 is a schematic diagram illustrating a control object in the second embodiment of the present invention.

FIG. 11 is a block diagram illustrating a trajectory control device 101 according to a second embodiment of the present invention. FIG. 12 is a schematic diagram illustrating a three-axis processing machine as a control object in the second embodiment.

In FIG. 12, a machining head 74 is attached to a Z-axis movable portion 73, and is driven in a Z-axis direction by a Z-axis motor (not illustrated). A Z-axis drive mechanism including the Z-axis movable portion 73 and the Z-axis motor is attached to a Y-axis movable portion 72, and is driven in the Y-axis direction by a Y-axis motor (not illustrated). Further, a Y-axis drive mechanism including the Y-axis movable portion 72 and the Y-axis motor is attached to an X-axis movable portion 71, and is driven in the X-axis direction by an X-axis motor (not illustrated). An X-axis drive mechanism including the X-axis movable portion 71 and the X-axis motor is attached to the processing machine body. It is assumed that the X axis, the Y axis, and the Z axis are orthogonal to each other.

The machining head 74, the X-axis movable portion 71, and the Y-axis movable portion 72 in FIG. 12 respectively correspond to the machining head 63, the X-axis movable portion 61, and the Y-axis movable portion 62 in FIG. 2.

The X-axis motor, the Y-axis motor, and the Z-axis motor is driven and controlled by the trajectory control device 101 illustrated in FIG. 11.

The present embodiment is different from the first embodiment in that the number of movable axes to be controlled is three, and the Z axis is newly added. Other configurations (the configurations of the X axis and the Y axis) are the same as those in the first embodiment. Further, a Z-axis response compensation unit 108 and a Z-axis servo control unit 111 have the same configuration as those of the X axis and the Y axis.

In the following explanations, different points from the first embodiment are described. If it is assumed that a coordinate of the nth command position Pcn is (xcn, ycn, zcn) by using the coordinate values on the X axis, the Y axis, and the Z axis, the integrated command length Lcn in an integrated-length calculation unit 102 can be obtained by the following equation (6).

[Equation 6]

$$L_{cn} = \sum_{k=1}^{n} \sqrt{(x_{ck} - x_{c(k-1)})^2 + (y_{ck} - y_{c(k-1)})^2 + (z_{ck} - z_{c(k-1)})^2} \quad (6)$$

The coordinate of the reference response position (xrn, yrn, zrn) in a reference-response calculation unit 104 can be obtained by the following equation (7).

[Equation 7]

$$x_{rn} = \frac{L_{rn} - L_{c(k-1)}}{|L_{ck} - L_{c(k-1)}|}(x_{ck} - x_{c(k-1)}) + x_{c(k-1)}$$

$$y_{rn} = \frac{L_{rn} - L_{c(k-1)}}{|L_{ck} - L_{c(k-1)}|}(y_{ck} - y_{c(k-1)}) + y_{c(k-1)} \quad (7)$$

$$z_{rn} = \frac{L_{rn} - L_{c(k-1)}}{|L_{ck} - L_{c(k-1)}|}(z_{ck} - z_{c(k-1)}) + z_{c(k-1)}$$

As described above, other configurations in the present embodiment are the same as those in the first embodiment.

An X-axis response compensation unit 106, a Y-axis response compensation unit 107, and a Z-axis response compensation unit 108 are configured in the same manner as the response compensation unit 40 illustrated in FIG. 7. That is, the transfer functions between an input and an output of the response compensation units of the X axis, the Y axis, and the Z axis are represented by the equation (5).

Further, a Z-axis servo control unit 111 has the same configuration as those of an X-axis servo control unit 109 and a Y-axis servo control unit 110, and a block diagram thereof is as illustrated in FIG. 3.

Outputs of the X-axis response compensation unit 106, the Y-axis response compensation unit 107, and the Z-axis response compensation unit 108 are respectively input to the X-axis servo control unit 109, the Y-axis servo control unit 110, and the Z-axis servo control unit 111, as the corrected command positions on the X axis, the Y axis, and the Z axis. The X-axis servo control unit 109, the Y-axis servo control unit 110, and the Z-axis servo control unit 111 respectively execute the servo control in the same manner as described in the first embodiment, and calculate and output the motor drive torque of the X axis, the Y axis, and the Z axis, thereby driving the X-axis motor, the Y-axis motor, and the Z-axis motor, respectively.

Example 2

Effects of the present embodiment are described by using an Example. As the command path, when being projected to an XY plane, a command path having a spiral shape with a circular arc of a radius of 5 millimeters is illustrated. It is assumed that while the X axis and the Y axis are performing one circular motion in the XY plane, the command path moves 10 millimeters in the Z direction.

A trajectory of the command position, that is, the command path used in the present Example, and a trajectory of the response position when correction of the command position is not performed are illustrated in FIG. 13. FIG. 13(a) is a trajectory projected on the XY plane and FIG. 13(b) is a trajectory projected on an XZ plane. A position at (X, Y, Z)=(0 mm, −5 mm, 0 mm) is a starting point, and a position at (X, Y, Z)=(0 mm, −5 mm, 10 mm) is an ending point. On the XY plane illustrated in FIG. 13(a), a circular trajectory is rotated counterclockwise.

The respective graphs in FIGS. 13(a) and 13(b) indicate simulation results of the servo response position, in which the solid line without dots represents a command position, and the solid line with dots represents a case where correction of the command position is not performed (in FIG. 11, when the command position on each movable axis is directly input to the servo control unit of each axis). As simulation conditions, it is assumed that the feed rate in a command path direction is 7.9 m/min. It is also assumed that an initial speed at the starting point is 0 m/s, and acceleration is performed at a certain rate until the speed in the tangent direction of the command path becomes 7.9 m/min, being the command feed rate. Such a pattern is used that near the ending point, the feed rate in the tangent direction of the command path is decelerated at a certain acceleration rate from 7.9 m/min, being the command feed rate, and becomes 0 m/min at the ending point. An absolute value of acceleration in the tangent direction at the time of acceleration and deceleration is set to 10 m/s².

The first model gain (control gain) $K_1$ in the normative models of the servo control units of the X axis, the Y axis, and the Z axis is respectively set to 40 rad/s, and the second model gain (control gain) $K_2$ is set to four times the first model gain (control gain) $K_1$. The control cycle T is set to 2 milliseconds.

Simulation results of a trajectory at the corrected command position and a trajectory at the corrected response position when correction of the command position is performed are illustrated in FIG. 14. FIG. 14(a) is a trajectory projected on the XY plane, and FIG. 14(b) is a trajectory projected on the XZ plane. In FIG. 14, the solid line without dots indicates a trajectory of the original command position, the broken line indicates a trajectory of the corrected command position, and the solid line with dots indicates a trajectory of the response position. As the values of the feed rate, and the first model gain $K_1$ and the second model gain $K_2$ of the servo control unit, the same values are used as those when correction of the command position is not performed.

When correction of the command position is performed, the trajectory of the original command position approximately matches the trajectory of the response position, and to distinguish the both cases, dots are added to a waveform of the corrected response position in FIG. 13 and FIG. 14.

Figure 15:
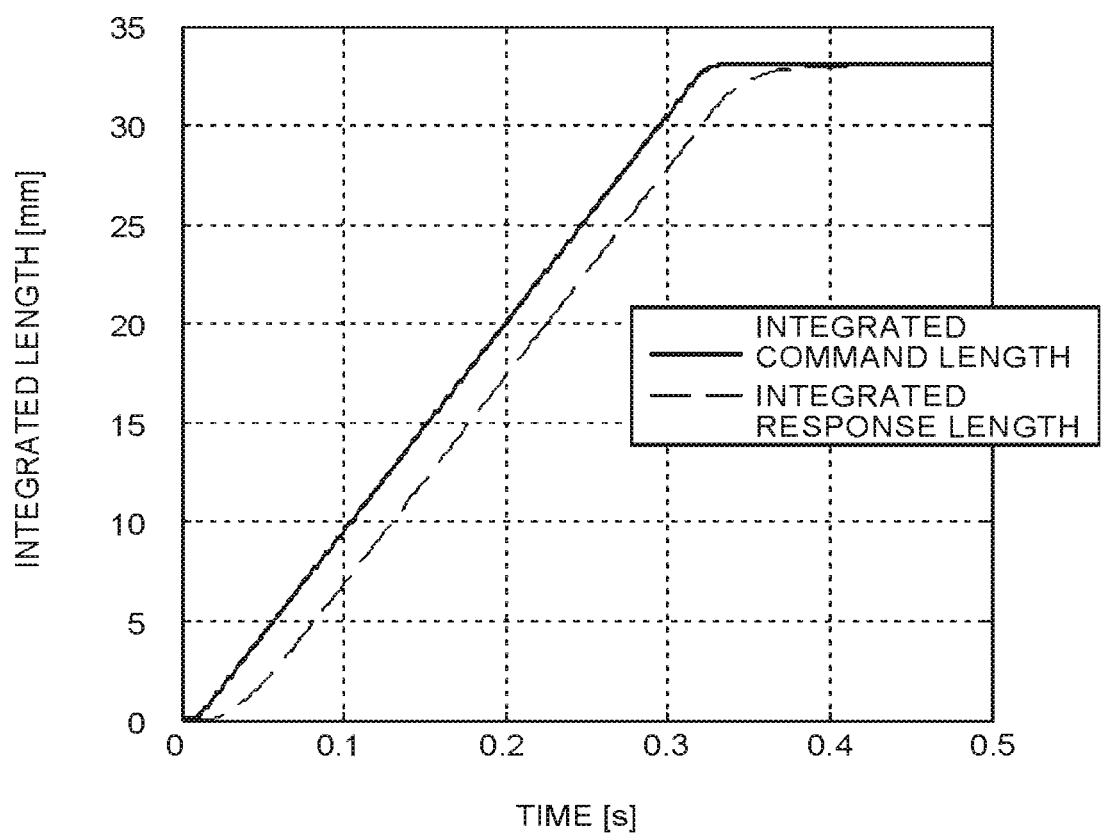
FIG. 15 is a diagram illustrating a time change of an integrated command length and an integrated response length in the second embodiment of the present invention.

FIG. 15 illustrates an input and an output of the simulated servo-response filter unit in the present Example, that are, time changes of the integrated command length and the integrated response length.

From FIG. 13, it is understood that in the trajectory of the servo response position when correction of the command position is not performed, a trajectory error has occurred in an inward direction of a circular arc shape which is a command trajectory as a whole, and the trajectory error becomes about 0.2 millimeters at a maximum. The command form used in the present Example has a form in which the moving direction is changed three-dimensionally from moment to moment, and thus a trajectory error is likely to occur in this shape. At the starting point and the ending point, the moving direction is changed, while performing acceleration and deceleration in the tangent direction, and the normal direction acceleration changes transitionally. Therefore, in this command path, it is difficult to perform accurate correction of the trajectory error.

It is also understood from FIG. 15 that, when correction of the command position is performed, a response is delayed with respect to the command in the integrated length direction. On the other hand, because the solid line with dots in FIG. 14 matches the solid line without dots in FIG. 14, it is understood that occurrence of trajectory errors with respect to the command path is sufficiently suppressed. This is a result of calculation of the corrected command position, as illustrated by the broken line in FIG. 14, by the response compensation unit of each axis so that the servo response follows the reference response position obtained from the integrated response length and the command position.

As described above, according to the present embodiment, even when the trajectory control is performed in a three-dimensional space such as in a three-axis vertical machining center, identical effects to those of the first embodiment can be acquired. Even in this case, highly accurate machining can be performed, while suppressing occurrence of trajectory errors.

Third Embodiment

Figure 16:
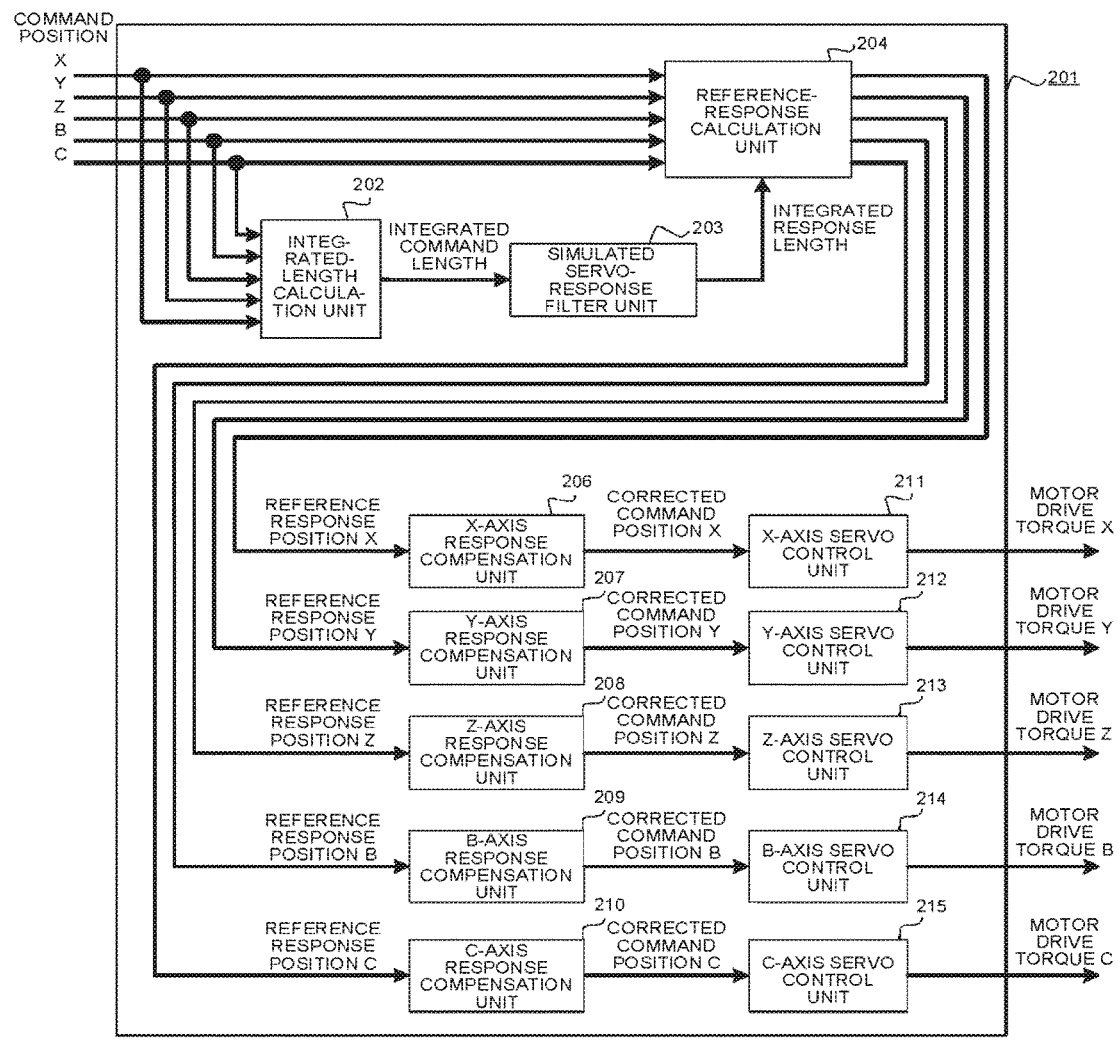
FIG. 16 is a block diagram illustrating a trajectory control device according to a third embodiment of the present invention.
Figure 17:
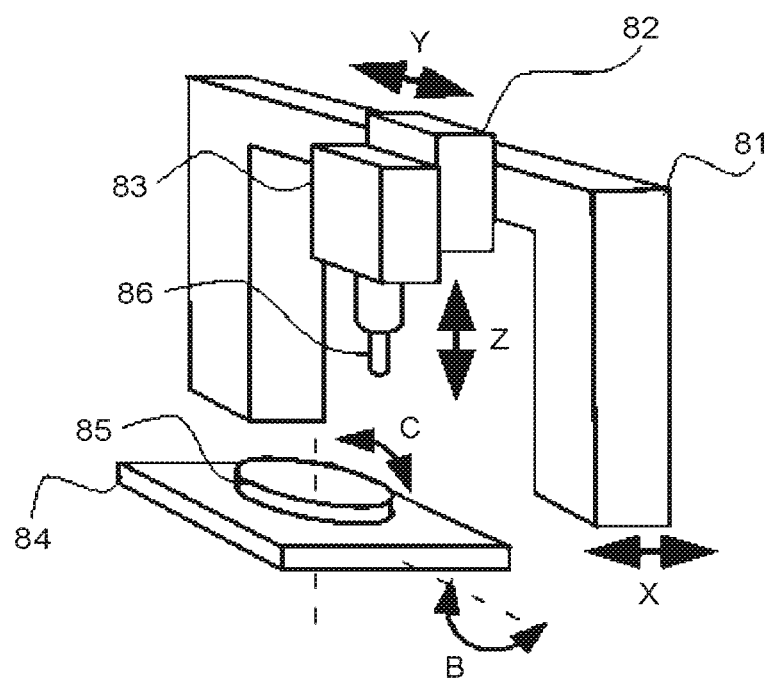
FIG. 17 is a schematic diagram illustrating a control object in the third embodiment of the present invention.

FIG. 16 is a block diagram illustrating a trajectory control device according to a third embodiment of the present invention. FIG. 17 is a schematic diagram illustrating a five-axis processing machine as a control object in the present embodiment.

In FIG. 17, a machining head 86, a Z-axis movable portion 83, a Y-axis movable portion 82, and an X-axis movable portion 81 respectively have the same configuration as that in the second embodiment. That is, the machining head 86, the Z-axis movable portion 83, the Y-axis movable portion 82, and the X-axis movable portion 81 respectively correspond to the machining head 74, the Z-axis movable portion 73, the Y-axis movable portion 72, and the X-axis movable portion 71 in FIG. 12.

In the present embodiment, a rotary table having a B axis rotating around the Y axis, and a C axis rotating around the Z axis is further provided, and by placing a workpiece on the rotary table, a tool direction (a tool posture) with respect to the workpiece can be controlled. A C-axis movable portion 85 functions as a rotary table, and is driven by a C-axis motor (not illustrated). A C-axis drive mechanism including the C-axis movable portion 85 and the C-axis motor is attached to a B-axis movable portion 84 and is driven by a B-axis motor (not illustrated). A B-axis drive mechanism including the B-axis movable portion 84 and the B-axis motor is attached to the processing machine body. It is assumed that a central axis of rotation of the B axis is parallel to the Y axis, and when a rotation angle of the B axis is 0°, a central axis of rotation of the C axis is parallel to the Z axis.

The motors of the X axis, the Y axis, the Z axis, the B axis, and the C axis is driven and controlled by the trajectory control device 201 illustrated in FIG. 16. The present embodiment is different from the second embodiment in that the number of axes to be controlled is five, and the B axis and the C axis are newly added, and other configurations are the same as those in the second embodiment. Further, the response compensation units and the servo control units of the B axis and the C axis have the same configuration as those of the X axis, the Y axis, and the Z axis.

The different points from the second embodiment are described below. When it is assumed that the coordinate of the nth command position Pcn is (xcn, ycn, zcn, bcn, ccn) by using coordinate values on respective axes of the X axis, the Y axis, the Z axis, the B axis, and the C axis, the integrated command length Lcn in an integrated-length calculation unit 202 can be obtained by the following equation (8).

[Equation 8]

$$L_{cn} = \sum_{k=1}^{n} \sqrt{\begin{array}{l}(x_{ck} - x_{c(k-1)})^2 + (y_{ck} - y_{c(k-1)})^2 + (z_{ck} - z_{c(k-1)})^2 + \\ (b_{ck} - b_{c(k-1)})^2 + (c_{ck} - c_{c(k-1)})^2\end{array}} \quad (8)$$

Subsequently, the coordinate of the reference response position (xrn, yrn, zrn, brn, crn) in a reference-response calculation unit 204 can be obtained by the following equation (9).

[Equation 9]

$$x_m = \frac{L_m - L_{c(k-1)}}{|L_{ck} - L_{c(k-1)}|}(x_{ck} - x_{c(k-1)}) + x_{c(k-1)} \quad (9)$$

$$y_m = \frac{L_m - L_{c(k-1)}}{|L_{ck} - L_{c(k-1)}|}(y_{ck} - y_{c(k-1)}) + y_{c(k-1)}$$

$$z_m = \frac{L_m - L_{c(k-1)}}{|L_{ck} - L_{c(k-1)}|}(z_{ck} - z_{c(k-1)}) + z_{c(k-1)}$$

$$b_m = \frac{L_m - L_{c(k-1)}}{|L_{ck} - L_{c(k-1)}|}(b_{ck} - b_{c(k-1)}) + b_{c(k-1)}$$

$$c_m = \frac{L_m - L_{c(k-1)}}{|L_{ck} - L_{c(k-1)}|}(c_{ck} - c_{c(k-1)}) + c_{c(k-1)}$$

As described above, other configurations of the present embodiment are the same as those in the second embodiment. An X-axis response compensation unit 206, a Y-axis response compensation unit 207, a Z-axis response compensation unit 208, a B-axis response compensation unit 209, and a C-axis response compensation unit 210 are configured in the same manner as the response compensation unit 40 illustrated in FIG. 7. The transfer function between an input and an output of the response compensation units of the X axis, the Y axis, the Z axis, the B axis, and the C axis are represented by the equation (5).

Furthermore, a B-axis servo control unit 214 and a C-axis servo control unit 215 have the same configuration as those of an X-axis servo control unit 211, a Y-axis servo control unit 212, and a Z-axis servo control unit 213, and a block diagram thereof is as illustrated in FIG. 3.

Outputs of the X-axis response compensation unit 206, the Y-axis response compensation unit 207, the Z-axis response compensation unit 208, the B-axis response compensation unit 209, and the C-axis response compensation unit 210 are input to the X-axis servo control unit 211, the Y-axis servo control unit 212, the Z-axis servo control unit 213, the B-axis servo control unit 214, and the C-axis servo control unit 215, respectively, as X-axis, Y-axis, Z-axis, B-axis, and C-axis corrected command positions. The X-axis servo control unit 211, the Y-axis servo control unit 212, the Z-axis servo control unit 213, the B-axis servo control unit 214, and the C-axis servo control unit 215 execute the servo control in the same manner as in the first embodiment to calculate and output the motor drive torque of the X axis, the Y axis, the Z axis, the B axis, and the C axis, thereby driving the X-axis motor, the Y-axis motor, the Z-axis motor, the B-axis motor, and the C-axis motor, respectively.

Example 3

Effects of the present embodiment are described by using an Example. As the command path, such a path is assumed that a path of a tool tip as viewed from the workpiece is a straight line, and a tool posture changes in the meantime. A coordinate system, in which the axial directions of the X axis, the Y axis, and the Z axis of the machine are respectively the X-, Y-, and Z-coordinate axis directions is defined as a machine coordinate system. A coordinate system that operates simultaneously with rotation of the table, in which when the B axis and the C axis are both 0 degree, the coordinate axis directions thereof match the machine coordinate system, is defined as a table coordinate system.

As an example, it is assumed that a coordinate value at the rotation center of a B-axis rotation table is (100 mm, 200 mm, 300 mm) in the machine coordinate system, and a coordinate at the rotation center of a C-axis rotation table is (100 mm, 200 mm, 400 mm) in the machine coordinate system. A position of the rotation center of the C-axis rotation table is set as an origin of the table coordinate system. In the table coordinate system, it is assumed that a coordinate value at the tool tip position moves from (0 mm, 200 mm, 0 mm) to (−200 mm, 0 mm, 0 mm), and the tool posture during this movement changes from a direction of (0, 1, 1) to a direction of (−1, 0, 1) as a vector expression.

To realize such a path of the tool tip, the respective axes of the machine need to move in a complicated path. Accordingly, the tool tip position and a tool posture vector in the table coordinate system are converted to a tool position (coordinate values at a position on the respective X, Y, and Z axes) and a rotation axis angle (coordinate values on the respective B and C rotation axes) in the machine coordinate system for each control cycle, and the coordinate values on the respective X, Y, Z, B, and C axes acquired by conversion are used as the command positions on the respective axes. The conversion can be uniquely performed by using a geometrical relation.

Figure 18:
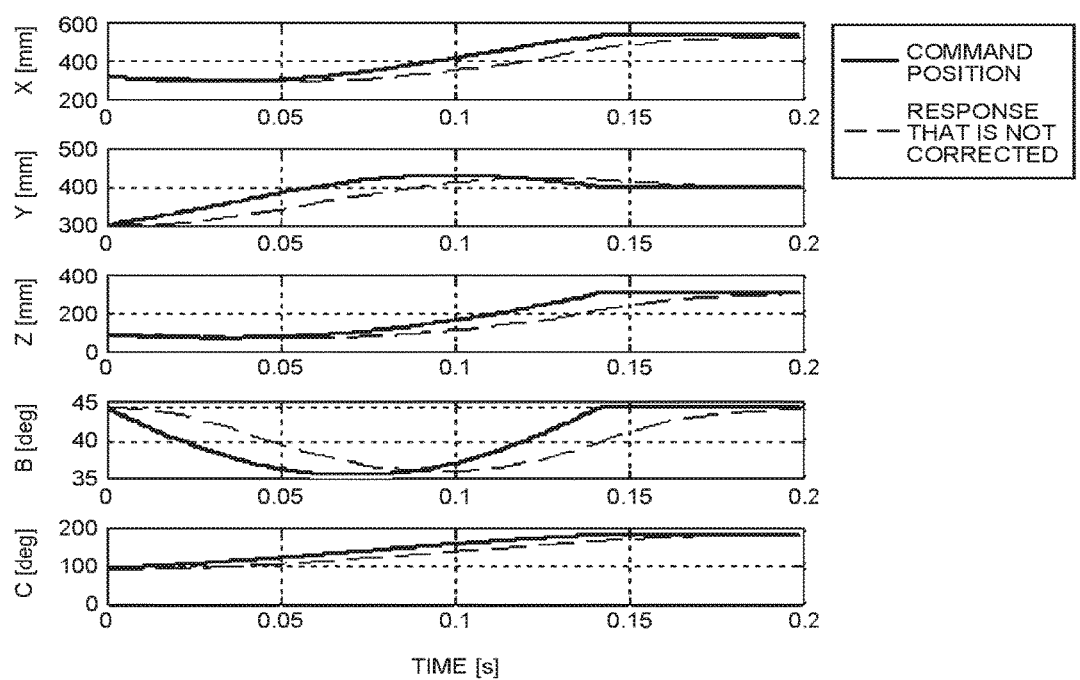
FIG. 18 is a diagram illustrating a time change of coordinate values on respective axes when correction of a command position is not performed in the third embodiment of the present invention.

Time changes of the command position used in the present Example and the response position when correction of the command position is not performed are illustrated in FIG. 18. In graphs in FIG. 18, the solid line indicates the command position, and the broken line indicates a simulation result of a servo response position when correction of the command position is not performed (in FIG. 16, when the command positions on the respective movable axes are directly input to the servo control units of the respective axes). As simulation conditions, the feed rate in the path direction is set to 2 m/min, the first model gain (control gain) $K_1$ in the normative model of the X-axis, Y-axis, Z-axis, B-axis, and C-axis servo control units is respectively set to 40 rad/s, and the second model gain (control gain) $K_2$ is set to four times the first model gain (control gain) $K_1$. The control cycle T is set to 2 milliseconds.

Figure 19:
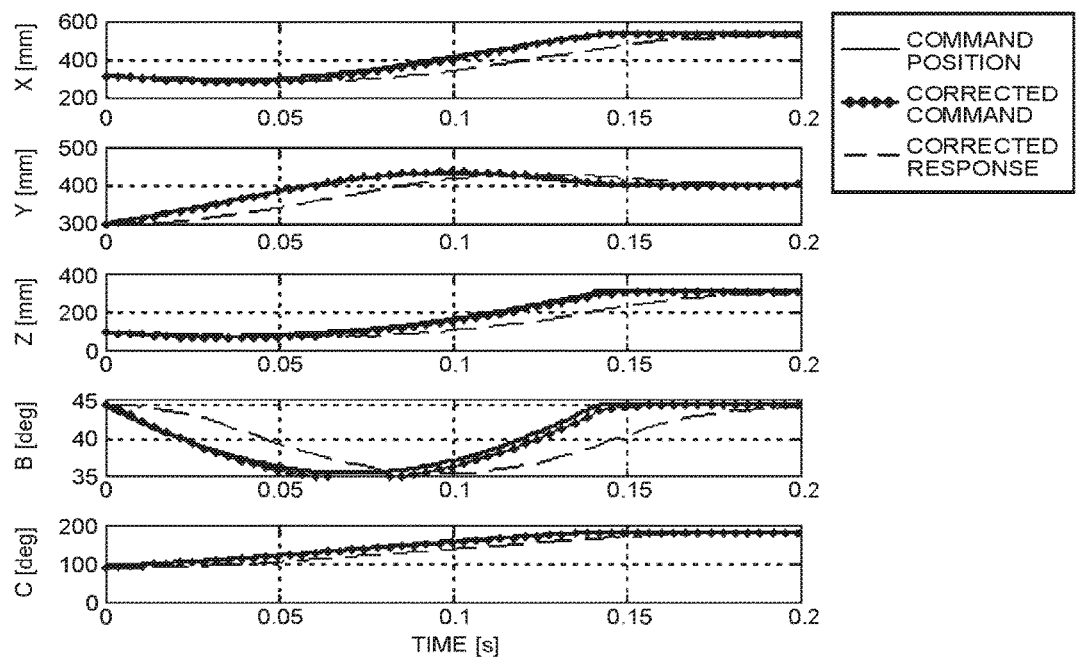
FIG. 19 is a diagram illustrating a time change of coordinate values on respective axes when correction of a command position is performed in the third embodiment of the present invention.

Subsequently, simulation results of a time change of the corrected command position and a time change of the corrected response position when correction of the command position is performed are illustrated in FIG. 19. In FIG. 19, the solid line without dots indicates the original command position, the solid line with dots indicates a trajectory of the corrected command position, and the broken line indicates a trajectory of the response position. In FIG. 19, the time change at the original command position and the time change at the corrected command position approximately match each other, and to distinguish the both cases, dots are added to a waveform of the corrected command position. As the values of the feed rate, and the first model gain $K_1$ and the second model gain $K_2$ of the servo control unit, the same values as those when correction of the command position is not performed are used.

From FIGS. 18 and 19, it is understood that the time change at the command position on each movable axis of the machine has a complicated shape, in order to realize and the movement the tool tip position of the tool posture in the table coordinate system. Even if correction of the command position is not performed or correction of the command position is performed, the response position follows the command position with delay; however, the response positions of the both cases follow the command position in a different manner from each other.

In the time change of the position on each movable axis, evaluation of the trajectory error cannot be performed. Therefore, the response position and the corrected command position are converted from the machine coordinate system to the table coordinate system, thereby performing the evaluation.

Figure 20:
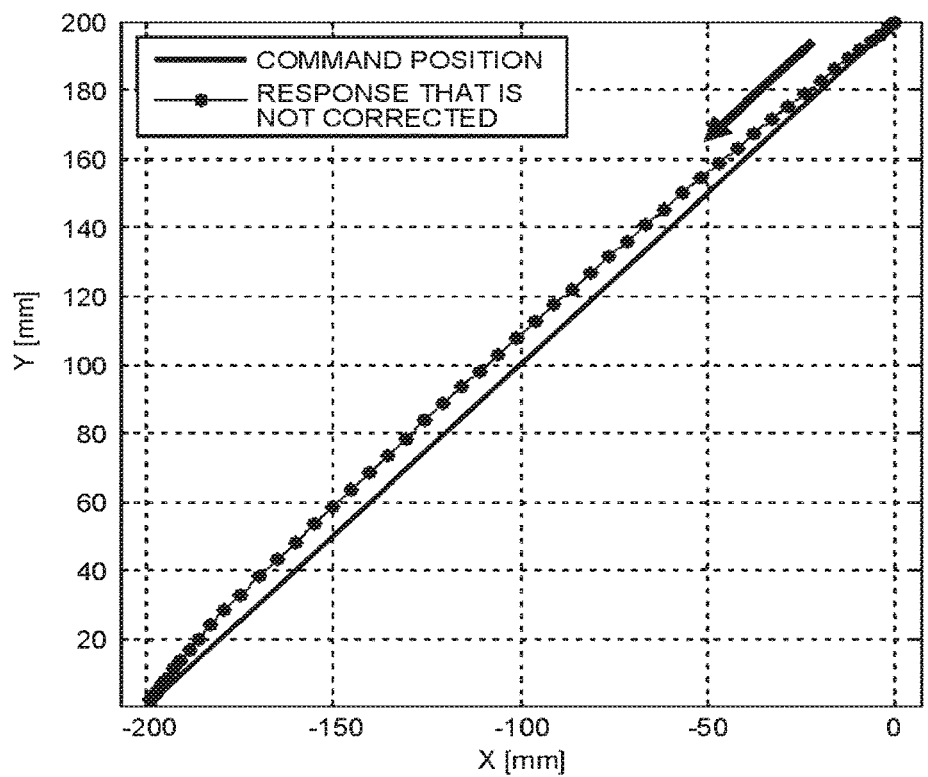
FIG. 20 is a diagram illustrating a trajectory when correction of a command position is not performed in the third embodiment of the present invention.

A trajectory of the command position and a trajectory of the response position when correction of the command position is not performed, in the table coordinate system are illustrated in FIG. 20. In each graph in FIG. 20, the solid line without dots indicates the command position, and the solid line with dots indicates a simulation result of a servo response position when correction of the command position is not performed (in FIG. 16, when the command positions on the respective movable axes are directly input to the servo control units of the respective axes).

Figure 21:
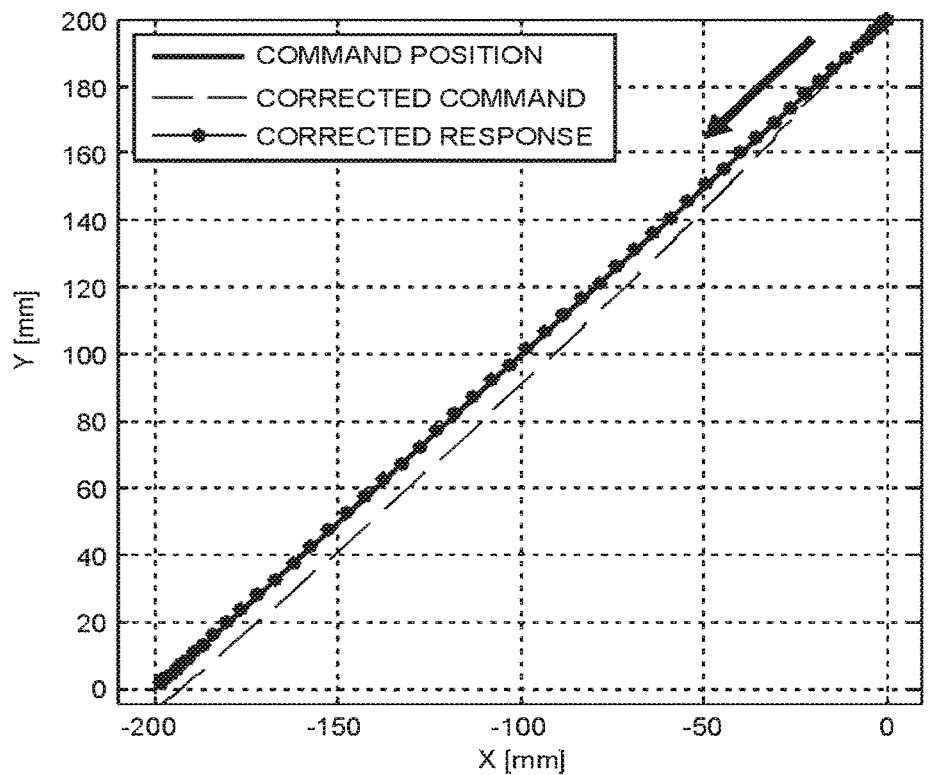
FIG. 21 is a diagram illustrating a trajectory when correction of a command position is performed in the third embodiment of the present invention.

Subsequently, a trajectory of the corrected command position and a trajectory of the corrected response position, when correction of the command position is performed, in the table coordinate system are illustrated in FIG. 21. In FIG. 21, the solid line without dots indicates a trajectory of the original command position, the broken line indicates a trajectory of the corrected command position, and the solid line with dots indicates a trajectory of the response position. As the values of the feed rate, and the first model gain $K_1$ and the second model gain $K_2$ of the servo control unit, the same values as those when correction of the command position is not performed are used. When correction of the command position is performed, the trajectory of the original command position and the trajectory of the response position approximately match each other. To distinguish the both cases, dots are added to the waveform of the response position in FIG. 20 and FIG. 21.

Figure 22:
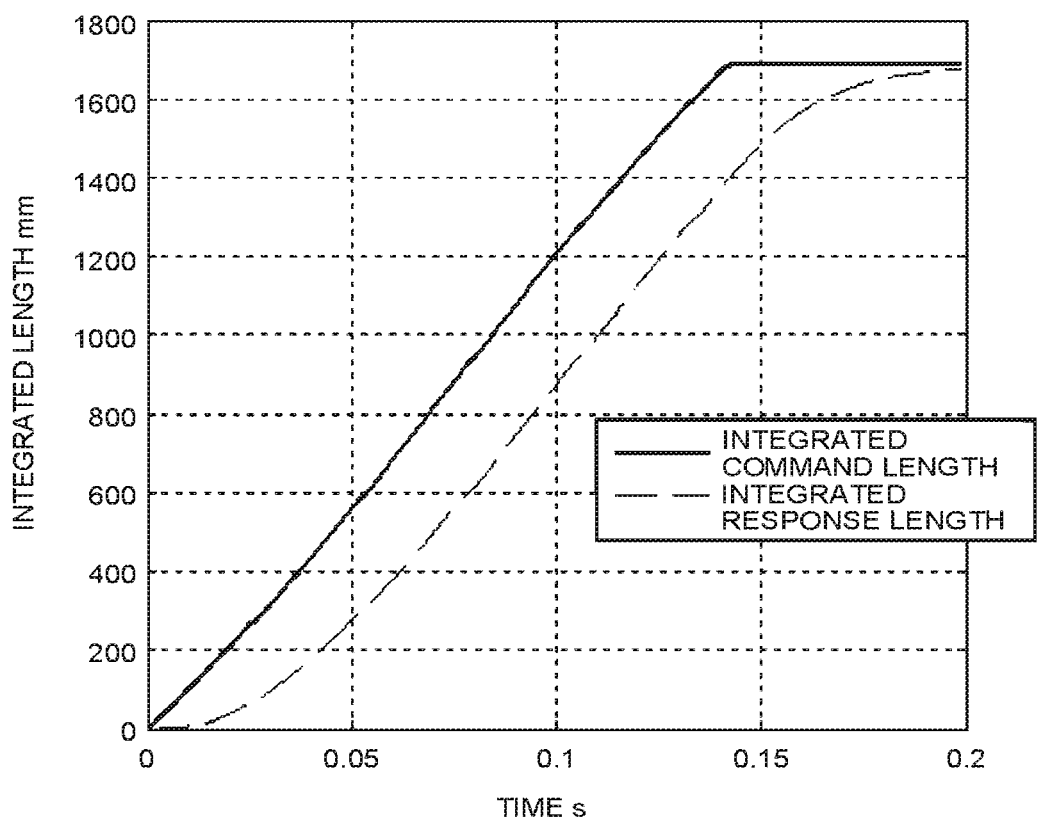
FIG. 22 is a diagram illustrating a time change of an integrated command length and an integrated response length in the third embodiment of the present invention.

FIG. 22 illustrates an input and an output of the simulated servo-response filter unit in the present Example, that are, time changes of the integrated command length and the integrated response length.

From FIG. 20, it is understood that, when correction of the command position is not performed, a trajectory error of about 5 millimeter has occurred in a central part of a straight line, due to an influence of the servo response delay on each axis. A command form used in the present Example is such that the respective movable axes of the machine move, while changing the acceleration from moment to moment, in order to realize movement as instructed of the tool tip position and the tool posture in the table coordinate system. Therefore, a following error on each movable axis of the machine is likely to occur as a trajectory error in the table coordinate system.

From FIG. 22, it is understood that, when correction of the command position is performed, in an integrated length direction, a response is made with delay with respect to the command. On the other hand, because the solid line with dots in FIG. 21 matches the solid line without dots in FIG. 21, it is understood that occurrence of trajectory errors with respect to the command path is suppressed sufficiently. This is a result of calculation of the corrected command position by the response compensation unit of each axis, as illustrated by the solid line with dots in FIG. 19 and the broken line in FIG. 21, so that the servo response follows the reference response position obtained from the integrated response length and the command position.

Furthermore, as illustrated in FIG. 19, a difference between the corrected command position and the command position at the same time takes a value smaller than the following error (a difference between the command position and the response position in FIG. 18). This is because the reference response position is calculated, while allowing the following error based on the integrated response length, and occurrence of trajectory errors can be effectively suppressed with a small correction amount.

As described above, according to the present embodiment, even if the trajectory control of the tool position and the posture is executed as in the five-axis processing machine, identical effects to those of the first embodiment can be acquired. Even in this case, highly accurate machining can be performed, while suppressing occurrence of trajectory errors.

In the present embodiment, a case where there are two axes of rotation on the table side has been described. However, the present invention is also applicable to a case where there are two axes of rotation on the tool side, or a case where the tool side and the table side respectively have one axis of rotation. Identical effects can be acquired by appropriately selecting and applying a conversion formula between a coordinate value in the mechanical coordinate system and a coordinate value in the table coordinate system.

Further, in the present embodiment, the two axes of rotation are the B axis that rotates around the Y axis and the C axis that rotates around the Z axis. However, an axis that rotates around another axis in other directions can be used. Identical effects can be acquired by applying an appropriate value to the conversion formula between the coordinate value in the mechanical coordinate system and the coordinate value in the table coordinate system.

In the first to third embodiments described above, cases where the number of movable axes is two, three, and five are described. However, identical effects can be acquired even if the number of movable axes is four or six or more. In these cases, it is sufficient if the integrated-length calculation unit calculates the integrated length corresponding to the number of movable axes, and the response compensation units and the servo control units are installed for the number corresponding to the number of movable axes.

REFERENCE SIGNS LIST

1, 101, 201 trajectory control device,
2, 102, 202 integrated-length calculation unit,
3, 103, 203 simulated servo-response filter unit,
4, 104, 204 reference-response calculation unit,
6, 106, 206 X-axis response compensation unit,
7, 107, 207 Y-axis response compensation unit,
8, 109, 211 X-axis servo control unit,
9, 110, 212 Y-axis servo control unit,
11 servo control unit,
12 normative model,
40 response compensation unit,
61, 71, 81 X-axis movable portion,
62, 72, 82 Y-axis movable portion,
73, 83 Z-axis movable portion,
84 B-axis movable portion,
85 C-axis movable portion,
108, 208 Z-axis response compensation unit,
111 Z-axis servo control unit,
209 B-axis response compensation unit,
210 C-axis response compensation unit,
213 Z-axis servo control unit,
214 B-axis servo control unit,
215 C-axis servo control unit.

The invention claimed is:

1. A trajectory control device that controls a trajectory of a movable portion of a processing machine driven by a plurality of axes, the trajectory control device comprising:
  circuitry configured to
    calculate an integrated command length, being a length integrated from a start position, along a command path defined as a history of a command position with respect to each of the plurality of axes,
    calculate an integrated response length by applying a first filter to the integrated command length, the first filter simulating a servo response of the processing machine with respect to the plurality of axes,
    calculate a reference response position, the reference response position being a position on the command path, at which a length from the start position along the command path is equal to the integrated response length, and
    calculate a corrected command position on each of the plurality of axes by applying a second filter to the reference response position, the second filter being applied with respect to respective coordinate values in each of the plurality of axes, and the second filter having inverse characteristics of the servo response; and
  a servo controller that controls each of the plurality of axes by outputting a drive torque based on the corrected command position, wherein
    the movable portion of a processing machine is configured to process a workpiece as the servo controller controls each of the plurality of axes by outputting the drive torque based on the corrected command position.

2. The trajectory control device according to claim 1, wherein a transfer function of the servo controller is same as a transfer function of the circuitry, which is used when simulating the servo response to calculate the integrated response length.

3. The trajectory control device according to claim 2, wherein the circuitry configured by a two degree-of-freedom controller using a normative model, and a transfer function of the normative model and the transfer function of the circuitry are the same.

4. The trajectory control device according to claim 3, wherein the second filter is a filter represented by an inverse transfer function that is an inverse of the transfer function of the normative model.

5. The trajectory control device according to claim 1, wherein
  the servo controller is configured to input the corrected command position as well as a speed signal and a position signal of a driving part for driving the plurality of axes,
  the servo controller includes a normative model configured to generate a model acceleration, a model position and a model speed in response to the corrected command position, and
  the servo controller outputs the drive torque based on a positional difference between the model position and the position signal, a speed difference between the model speed and the speed signal and the model acceleration.

6. The trajectory control device according to claim 5, wherein
the normative model includes
a first model-gain multiplier configured to multiply a first subtracted value by a first model gain and output as a first multiplied value, the first subtracted value being obtained by subtracting the model position from the corrected command position, and
a second model-gain multiplier configured to multiply a second subtracted value by a second model gain and output as the model acceleration, the second subtracted value being obtained by subtracting the model speed from the first multiplied value, and
the servo controller includes
a position configured to execute proportional control on a third subtracted value that is obtained by subtracting the position signal from the model position, and
a speed controller configured to execute proportional-integral control on a fourth subtracted value that is obtained by subtracting the speed signal from the model speed.

* * * * *